United States Patent [19]
Merrill et al.

[11] Patent Number: 6,111,697
[45] Date of Patent: *Aug. 29, 2000

[54] OPTICAL DEVICE WITH A DICHROIC POLARIZER AND A MULTILAYER OPTICAL FILM

[75] Inventors: William W. Merrill, White Bear Lake; Timothy J. Hebrink, Oakdale; Brian H. Williams, White Bear Lake; William L. Kausch, Cottage Grove, all of Minn.

[73] Assignee: 3M Innovative Properties Company, St. Paul, Minn.

[*] Notice: This patent issued on a continued prosecution application filed under 37 CFR 1.53(d), and is subject to the twenty year patent term provisions of 35 U.S.C. 154(a)(2).

[21] Appl. No.: 09/006,468

[22] Filed: Jan. 13, 1998

[51] Int. Cl.⁷ ..................................................... G02B 5/30

[52] U.S. Cl. ........................... 359/497; 359/490; 359/500

[58] Field of Search ..................................... 359/483, 485, 359/487, 488, 490, 493, 497, 498, 500; 252/585

[56] References Cited

U.S. PATENT DOCUMENTS

| | | |
|---|---|---|
| 2,444,712 | 7/1948 | Signaigo . |
| 2,803,552 | 8/1957 | Stedman . |
| 3,022,178 | 8/1962 | Park et al. . |
| 3,075,228 | 1/1963 | Elias . |
| 3,124,639 | 3/1964 | Kahn ........................................... 88/65 |
| 3,212,909 | 10/1965 | Leigh . |
| 3,610,729 | 10/1971 | Rogers ..................................... 350/157 |
| 3,711,176 | 1/1973 | Alfrey, Jr. et al. .......................... 350/1 |
| 3,819,522 | 6/1974 | Zmoda . |
| 3,860,036 | 1/1975 | Newman, Jr. .............................. 138/45 |
| 3,897,356 | 7/1975 | Pociluyko . |

(List continued on next page.)

FOREIGN PATENT DOCUMENTS

| | | |
|---|---|---|
| 0395019 | 10/1990 | European Pat. Off. . |
| 591055 | 9/1993 | European Pat. Off. . |
| 592284 | 9/1993 | European Pat. Off. . |
| 4227522 | 2/1994 | Germany . |
| 6-41335 | 2/1994 | Japan . |
| WO 95/27919 | 4/1995 | WIPO ............................. G02B 27/28 |
| WO 95/17303 | 6/1995 | WIPO ............................. B32B 7/02 |
| WO 95/17691 | 6/1995 | WIPO ............................. G02B 5/30 |
| WO 95/17692 | 6/1995 | WIPO ............................. G02B 5/30 |
| WO 95/17699 | 6/1995 | WIPO ........................... G02F 1/1335 |
| WO 96/18691 | 6/1996 | WIPO . |
| WO 96/19347 | 6/1996 | WIPO ............................. B32B 7/02 |
| WO 97/01440 | 1/1997 | WIPO ............................ B32B 27/36 |
| WO 97/01774 | 1/1997 | WIPO ............................. G02B 1/10 |
| WO 97/01788 | 1/1997 | WIPO . |
| WO 97/32226 | 9/1997 | WIPO ............................. G02B 5/30 |

OTHER PUBLICATIONS

Encyclopedia, Kirk–Othmer Encyclopedia of Chemical Technology, vol. 8, pp. 652–661 (4$^{th}$ Ed.).

Ferry, Viscoelastic Properties of Polymers, John Wiley & Sons, New York, 1970.

Schrenk et al., Nanolayer polymeric optical films, Tappi Journal, pp. 169–174, Jun., 1992.

*Primary Examiner*—Darren E. Schuberg
*Attorney, Agent, or Firm*—John A. Burtis

[57] ABSTRACT

An optical device includes a dichroic polarizer and a multilayer optical film, such as a reflective polarizer or mirror. The multilayer optical film is made using polymers which may allow for the simultaneous orientation of the dichroic and reflective polarizers. The multilayer optical film often contains a set of birefringent first layers and a set of second layers, which may have an isotropic index of refraction. The dichroic polarizers is a polyvinyl alcohol film with a dichroic dye. The multilayer optical film and dichroic polarizer can be stretched at temperatures of 130° C. or less to orient the two films without substantial cracking of the dichroic polarizer. When an optional second polymer is combined with the polyvinyl alcohol, the multilayer optical film and dichroic polarizer can be stretched at temperatures of about 160° C. without substantial cracking of the dichroic polarizer.

32 Claims, 6 Drawing Sheets

U.S. PATENT DOCUMENTS

| | | | |
|---|---|---|---|
| 4,249,011 | 2/1981 | Wendling . | |
| 4,446,305 | 5/1984 | Rogers et al. | 528/348 |
| 4,478,909 | 10/1984 | Taniguchi et al. . | |
| 4,520,189 | 5/1985 | Rogers et al. | 528/331 |
| 4,521,588 | 6/1985 | Rogers et al. | 528/363 |
| 4,525,413 | 6/1985 | Rogers et al. | 428/212 |
| 4,659,523 | 4/1987 | Rogers et al. . | |
| 4,659,563 | 4/1987 | Dobkin . | |
| 4,720,426 | 1/1988 | Englert et al. | 428/344 |
| 4,890,365 | 1/1990 | Langer . | |
| 5,188,760 | 2/1993 | Hikmet et al. | 252/299.01 |
| 5,211,878 | 5/1993 | Reiffenrath et al. | 252/299.63 |
| 5,235,443 | 8/1993 | Barnik et al. | 359/37 |
| 5,269,995 | 12/1993 | Ramanathan et al. | 264/171 |
| 5,294,657 | 3/1994 | Melendy et al. | 524/270 |
| 5,316,703 | 5/1994 | Schrenk | 264/1.3 |
| 5,319,478 | 6/1994 | Fijnfschilling et al. | 359/53 |
| 5,389,324 | 2/1995 | Lewis et al. | 264/171 |
| 5,427,835 | 6/1995 | Morrison et al. . | |
| 5,448,404 | 9/1995 | Schrenk et al. | 359/584 |
| 5,486,935 | 1/1996 | Kalmanash | 359/37 |
| 5,486,949 | 1/1996 | Schrenk et al. | 359/498 |
| 5,506,704 | 4/1996 | Broer et al. . | |
| 5,612,820 | 3/1997 | Schrenk et al. | 359/498 |
| 5,629,055 | 5/1997 | Revol et al. | 428/1 |
| 5,686,979 | 11/1997 | Weber et al. | 349/96 |
| 5,691,789 | 11/1997 | Li et al. . | |
| 5,699,188 | 12/1997 | Gilbert et al. | 359/584 |
| 5,721,603 | 2/1998 | De Vaan et al. | 349/194 |
| 5,744,534 | 4/1998 | Ishiharada et al. | 524/442 |
| 5,751,388 | 5/1998 | Larson | 349/96 |
| 5,759,467 | 6/1998 | Carter et al. . | |
| 5,767,935 | 6/1998 | Ueda et al. | 349/112 |
| 5,770,306 | 6/1998 | Suzuki et al. | 428/328 |
| 5,783,120 | 7/1998 | Ouderkirk et al. | 264/134 |
| 5,793,456 | 8/1998 | Broer et al. | 349/98 |
| 5,808,794 | 9/1998 | Weber et al. | 359/487 |
| 5,825,542 | 10/1998 | Cobb, Jr. et al. | 359/487 |
| 5,825,543 | 10/1998 | Ouderkirk et al. | 359/494 |
| 5,867,316 | 2/1999 | Carlson et al. . | |
| 5,882,774 | 3/1999 | Jonza et al. . | |

OPTICAL DEVICE WITH A DICHROIC POLARIZER AND A MULTILAYER OPTICAL FILM

FIELD OF THE INVENTION

The present invention relates to a multilayer optical device which includes a dichroic polarizer and a multilayer optical film. More particularly, the invention relates to an optical polarizer having a dichroic polarizer and a multilayer optical film with copolyester optical layers.

BACKGROUND OF THE INVENTION

Optical polarizing film is widely used for glare reduction and for increasing optical contrast in such products as sunglasses and Liquid Crystal Displays (LCD). One of the most commonly used types of polarizers for these applications is a dichroic polarizer which absorbs light of one polarization and transmits light of the other polarization. One type of dichroic polarizer is made by incorporating a dye into a polymer matrix which is stretched in at least one direction. Dichroic polarizers may also be made by uniaxially stretching a polymer matrix and staining the matrix with a dichroic dye. Alternatively, a polymer matrix may be stained with an oriented dichroic dye. Dichroic dyes include anthraquinone and azo dyes, as well as iodine. Many commercial dichroic polarizers use polyvinyl alcohol as the polymer matrix for the dye.

Another type of polarizer is a reflective polarizer which reflects light of one polarization and transmits light of another orthogonal polarization. One type of reflective polarizer is made by forming a stack of alternating sets of polymer layers, one of the sets being birefringent to form reflective interfaces in the stack. Typically, the indices of refraction of the layers in the two sets are approximately equal in one direction so that light polarized in a plane parallel to that direction is transmitted. The indices of refraction are typically different in a second, orthogonal direction so that light polarized in a plane parallel to the orthogonal direction is reflected.

One measure of performance for polarizers is the extinction ratio. The extinction ratio is the ratio of a) light transmitted by the polarizer in a preferentially transmitted polarization state to b) light transmitted in an orthogonal polarization state. These two orthogonal states are often related to the two linear polarizations of light. However, other types of orthogonal states, such as, left and right-handed circular polarizations or two orthogonal elliptical polarizations may also be used. The extinction ratios of dichroic polarizers vary over a wide range depending on their specific construction and target application. For example, dichroic polarizers may have extinction ratios between 5:1 and 3000:1. Dichroic polarizers used in display systems typically have extinction ratios which are preferably greater than 100:1 and even more preferably greater than 500:1.

Dichroic polarizers typically absorb light in the non-transmission polarization. However, dichroic polarizers also absorb some of the light having the high transmission polarization. The amount of this absorption depends on the details of the construction of the polarizer and the designed extinction ratio. For high performance display polarizers, such as those used in LCDs, this absorption loss is typically between about 5 and 15%. The reflectivity of these polarizers for light having the absorption (i.e., low transmission) polarization tends to be small. Even with surface reflections included, this reflectivity is typically less than 10% and usually less than 5%.

Reflective polarizers typically reflect light having one polarization and transmit light having an orthogonal polarization. Reflective polarizers often have incomplete reflectivity of the high extinction polarization over a wavelength region of interest. Typically, the reflectivity is greater than 50% and is often greater than 90% or 95%. A reflective polarizer will also typically have some absorption of light having the high transmission polarization. Typically, this absorption is less than about 5 to 15%.

The above two types of polarizers may be combined to make a single optical polarizer, thereby incorporating the useful characteristics of both types of polarizers. These polarizers may be formed and, optionally, oriented together. Unfortunately, the polyvinyl alcohol film used in many dichroic polarizers tends to crack under the processing conditions necessary to prepare some reflective polarizers, including, for example, those which use polyethylene naphthalate (PEN) or coPEN optical layers. These reflective polarizers may be formed by stretching a polymeric film at processing temperatures, such as 135 to 180° C., and a stretch ratio of between 2:1 and 10:1.

Dichroic polarizers may also be used with other optical devices, such as other types of reflective polarizers and mirrors. The combination of a dichroic polarizer with an IR mirror may be useful for reducing glare. The formation of the dichroic polarizer in combination with the mirror retains the processing difficulties mentioned above, especially when the mirror is made using oriented polyester layers. Thus, there is a need for improved reflective polarizers and other optical devices which can be simultaneously oriented with dichroic polarizers without cracking the dichroic polarizer film.

SUMMARY OF THE INVENTION

Accordingly, the present invention relates to optical devices which include a dichroic polarizer and multilayer polymer films formed using copolyester materials. One embodiment is an optical device having a dichroic polarizer and a multilayer optical film positioned in the same optical path as the dichroic polarizer. The multilayer optical film includes a plurality of first optical layers and a plurality of second optical layers. The first optical layer are made using a first copolyester. The first copolyester has carboxylate subunits and glycol subunits, in which 70 to 100 mol % of the carboxylate subunits are first carboxylate subunits, 0 to 30 mol % of the carboxylate subunits are first comonomer carboxylate subunits, 70 to 100 mol % of the glycol subunits are first glycol subunits, 0 to 30 mol % of the glycol subunits are first comonomer glycol subunits, and at least 0.5 mol % of the combined carboxylate and glycol subunits of the first copolyester are first comonomer carboxylate subunits, first comonomer glycol subunits, or a combination thereof. The second optical layers are made of a second polymer.

Another embodiment is an optical device having a dichroic polarizer and a reflective polarizer positioned in the same optical path as the dichroic polarizer. The reflective polarizer includes a plurality of first optical layers and a plurality of second optical layers. The first optical layer are made using a first copolyester which is birefringent and semicrystalline. The first copolyester has carboxylate subunits and glycol subunits, in which 70 to 100 mol % of the carboxylate subunits are first carboxylate subunits, 0 to 30 mol % of the carboxylate subunits are first comonomer carboxylate subunits, 70 to 100 mol % of the glycol subunits are first glycol subunits, 0 to 30 mol % of the glycol subunits are first comonomer glycol subunits, and at least 0.5 mol % of the combined carboxylate and glycol subunits of the first copolyester are first comonomer carboxylate subunits, first comonomer glycol subunits, or a combination thereof The second optical layers are made of a second polymer which has an in-plane birefringence of about 0.04 or less, at 632.8 nm, after the reflective polarizer has been formed.

A further embodiment is a method of making an optical polarizer. The method includes forming a reflective polarizer. The reflective polarizer has a plurality of first optical layers and a plurality of second optical layers. The first optical layer are made using a first copolyester which is birefringent and semicrystalline. The first copolyester has carboxylate subunits and glycol subunits, in which 70 to 100 mol % of the carboxylate subunits are first carboxylate subunits, 0 to 30 mol % of the carboxylate subunits are first comonomer carboxylate subunits, 70 to 100 mol % of the glycol subunits are first glycol subunits, 0 to 30 mol % of the glycol subunits are first comonomer glycol subunits, and at least 0.5 mol % of the combined carboxylate and glycol subunits of the first copolyester are first comonomer carboxylate subunits, first comonomer glycol subunits, or a combination thereof. The second optical layers are made of a second polymer which has an in-plane birefringence of about 0.04 or less, at 632.8 nm, after the reflective polarizer has been formed. A dichroic polarizer is formed on the reflective polarizer. The dichroic polarizer includes polyvinyl alcohol and a dichroic dye material. The dichroic polarizer and reflective polarizer are stretched to orient the dichroic and reflective polarizers at a temperature of about 130° C. or less, without substantial cracking of the dichroic polarizer. In another embodiment, the dichroic polarizer includes a dispersion or solution of polyvinyl alcohol and a second polymer and a dichroic dye material. The dichroic polarizer and reflective polarizer may be stretched to orient the dichroic and reflective polarizers at a temperature of about 160° C. or less, without substantial cracking of the dichroic polarizer.

The above summary of the present invention is not intended to describe each illustrated embodiment or every implementation of the present invention. The figures and the detailed description which follow more particularly exemplify these embodiments.

BRIEF DESCRIPTION OF THE DRAWINGS

The invention may be more completely understood in consideration of the following detailed description of various embodiments of the invention in connection with the accompanying drawings, in which.

Figure 1:
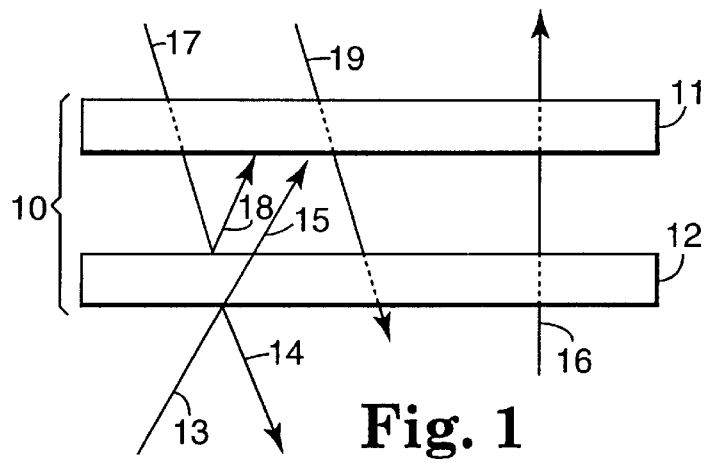
FIG. 1 is a side elevational view of one embodiment of an optical device according to the present invention.

While the invention is amenable to various modifications and alternative forms, specifics thereof have been shown by way of example in the drawings and will be described in detail. It should be understood, however, that the intention is not to limit the invention to the particular embodiments described. On the contrary, the intention is to cover all modifications, equivalents, and alternatives falling within the spirit and scope of the invention as defined by the appended claims.

DETAILED DESCRIPTION

The present invention is directed to the formation of optical devices using a dichroic polarizer and a multilayer optical film which is formed using polymers that allow for simultaneous orientation of the multilayer optical film and the dichroic polarizer. The multilayer optical film may be a reflective polarizer, mirror, IR mirror, or other optical configuration. Although, many of the following examples are directed to the use of a multilayer optical film as a reflective polarizer, it will be understood that similar multilayer optical films with other optical characteristics may also be used.

FIG. 1 illustrates an exemplary device, namely an optical polarizer 10 which includes a dichroic polarizer 11 and a reflective polarizer 12. This combination of two different types of polarizers may create an optical polarizer with a high reflection/absorption of light of one polarization and a high transmission of light with a second, orthogonal polarization. Typically, the two polarizers are aligned with respect to each other to provide maximum transmissivity of light having a particular polarization.

The dichroic polarizer 11 is typically in close proximity to the reflective polarizer 12, although this is not necessary. Preferably, the two polarizers 11, 12 are bonded to each other to eliminate any air gap.

The reflective polarizer 12 usually reflects a substantial portion of light having a first polarization and transmits most of the light having a second, orthogonal polarization. The dichroic polarizer 11 typically absorbs most of light having a third polarization and transmits a substantial portion of light having a fourth, orthogonal polarization. Often, the optical polarizer 10 is formed by orienting the reflective polarizer 12 and the dichroic polarizer 11 so that they transmit light of a particular polarization (i.e., the second and fourth polarization are the same) and reflect/absorb light of an orthogonal polarization (i.e., the first and third polarizations are the same). The present invention will be discussed with reference to this particular configuration. However, other configurations in which the reflective polarizer 12 and the dichroic polarizer 11 are oriented in a different manner with respect to each other are also possible and included within the invention.

In use, the combined polarizers are illuminated on one or both of the outside facing surfaces, as illustrated in FIG. 1. Ray 13 is light having a polarization that is preferentially reflected by the reflective polarizer 12 to form ray 14. Ray 15 is light from ray 13 that is transmitted by the reflective polarizer 12. Typically, ray 15 is much less intense than ray 14. In addition, ray 15 is usually attenuated by the dichroic polarizer 11. Light ray 16, which is orthogonally polarized to ray 13, is preferentially transmitted by the reflective polarizer 12 and is typically only slightly attenuated by the dichroic polarizer 11.

Ray 17 is light having a polarization that is preferentially absorbed by the dichroic polarizer 11, and which preferably has the same polarization as ray 13. The portion of ray 17 which is transmitted by the dichroic polarizer 11 is further attenuated by reflection off the reflective polarizer 12, thereby forming ray 18. Light ray 19 is polarized orthogonally to ray 17 and preferably has the same polarization as ray 16. Ray 19 is preferentially transmitted by both the dichroic polarizer 11 and the reflective polarizer 12.

Combining the dichroic polarizer 11 with the reflective polarizer 12 results in an optical polarizer 10 which has a higher extinction ratio of the transmitted light than would be the case with a dichroic polarizer by itself. This allows for the use of a dichroic polarizer with a lower extinction ratio. This may be useful, as dichroic polarizers typically absorb some of the light that is to be transmitted. Using a dichroic polarizer with a lower extinction ratio may increase the amount of light of the desired polarization which is transmitted. For light polarized along the extinction axis, the preferred extinction percentage for the dichroic polarizer is 10% or greater, more preferred is 55% or greater, and most preferred is 70% or greater. The best choice of dichroic and reflective polarizers depends on the design goals, including the allowed reflectivity from the dichroic polarizer side of the film, the extinction ratio of the reflective polarizer, and the desired final polarizer contrast.

The combination of the reflective polarizer with the dichroic polarizer has other advantages. For example, this combination has a high reflectivity from one side of the film for one polarization and a low reflectivity from the other side of the film. The combination of these two characteristics may be useful in a number of systems including direct view LCDs. For example, a direct view LCD might have a back side reflectivity of 1% and require a final extinction ratio greater than 1000:1. To achieve 1% reflectivity when combined with a reflective polarizer with an approximately 100% reflectivity, the dichroic polarizer would need to transmit 10% or less of light polarized in the extinction direction. If the reflective polarizer has an extinction ratio of 50:1, then the dichroic polarizer would typically require an extinction ratio of at least 20:1 to achieve the final extinction ratio of 1000:1.

The reflective polarizer 12 may contain internal structure, such as interfaces between different materials, where the index is not exactly matched in the appropriate directions, or other scattering centers. Both of these types of internal structure may interfere with light which would normally be transmitted through the polarizer. In general, it is preferred that the reflection of light having the transmission polarization by the reflective polarizer 12 be about 30% or less, more preferably about 20% or less, and most preferably about 15% or less. In addition, the reflectivity of the reflective polarizer depends on the wavelength range and the angle of incident light. The preferred reflection percentage by the reflective polarizer 12 for light having the reflection polarization and within a wavelength range of interest is 20% or greater, more preferably 50% or greater and most preferably 90% or greater.

Similar design features and parameters may be used when the multilayer optical film is a mirror or IR mirror. The preferred reflection percentage by a mirror for light with a wavelength range of interest, whether visible or infrared, is 20% or greater, more preferably about 50% or greater, and most preferably about 90% or greater.

Multilayer Optical Films

Figure 2:
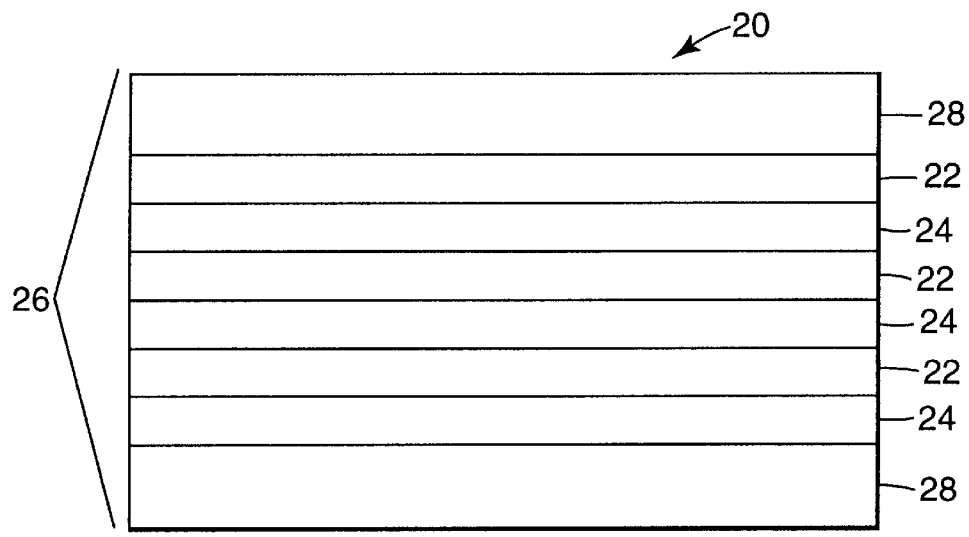
FIG. 2 is a side elevational view of one embodiment of a multilayer optical film for use in the optical device of FIG. 1.

One example of a useful multilayer optical film 20 is shown in FIG. 2. This multilayer optical film 20 may be used to make reflective polarizers, mirrors and other optical devices. The multilayer optical film 20 includes one or more first optical layers 22, one or more second optical layers 24, and one or more non-optical layers 28. The first optical layers 22 are often birefringent polymer layers which are uniaxially- or biaxially-oriented. In some embodiments, the first optical layers 22 are not birefringent. The second optical layers 24 may be polymer layers which are birefringent and uniaxially- or biaxially-oriented. More typically, however, the second optical layers 24 have an isotropic index of refraction which is different than at least one of the indices of refraction of the first optical layers 22 after orientation. The methods of manufacture and use, as well as design considerations for the multilayer optical films 20 are described in detail in U.S. patent application Ser. No. 08/402,041 entitled "Multilayered Optical Film", U.S. Patent Application entitled "Modified Copolyesters and Improved Multilayer Reflective Films", filed on even date by applicants under Attorney Docket No. 53550USA6A, and U.S. Patent Application entitled "Process for Making Multilayer Optical Film", filed on even date by applicants under Attorney Docket No. 51932USA8A, all of which are herein incorporated by reference. Although, the present invention will be primarily exemplified by multilayer optical films 20 with second optical layers 24 which have an isotropic index of refraction, the principles and examples described herein may be applied to multilayer optical films 20 with second optical layers 24 that are birefringent, as described in, for example, U.S. Patent Application entitled "Optical Film and Process for the Manufacture Thereof" filed on even date by applicants under Attorney Docket No. 53546USA5A, incorporated herein by reference.

Additional sets of optical layers, similar to the first and second optical layers 22, 24, may also be used in the multilayer optical film 20. The design principles disclosed herein for the sets of first and second optical layers may be applied to any additional sets of optical layers. Furthermore, it will be appreciated that, although only a single stack 26 is illustrated in FIG. 2, the multilayer optical film 20 may be made from multiple stacks that are subsequently combined to form the film 20.

The optical layers 22, 24 and, optionally, one or more of the non-optical layers 28 are typically placed one on top of the other to form a stack 26 of layers. Usually the optical layers 22, 24 are arranged as alternating pairs, as shown in FIG. 2, to form a series of interfaces between layers with different optical properties. The optical layers 22, 24 are typically less than 1 Tm thick, although thicker layers may be used. Furthermore, although FIG. 2 shows only six optical layers 22, 24, many multilayer optical films 20 have a large number of optical layers. Typical multilayer optical films 20 have about 2 to 5000 optical layers, preferably about 25 to 2000 optical layers, more preferably about 50 to 1500 optical layers, and most preferably about 75 to 1000 optical layers.

The non-optical layers 28 are polymer layers that are disposed within (see FIG. 3) and/or over (see FIG. 2) the stack 26 to protect the optical layers 22, 24 from damage, to aid in the co-extrusion processing, and/or to enhance post-processing mechanical properties. The non-optical layers 28 are often thicker than the optical layers 22, 24. The thickness of the non-optical layers 28 is usually at least two times, preferably at least four times, and more preferably at least ten times, the thickness of the individual optical layers 22, 24. The thickness of the non-optical layers may be varied to obtain a particular optical film 20 thickness. Typically, one or more of the non-optical layers 28 are placed so that at least a portion of the light to be transmitted, polarized, and/or reflected by the optical layers 22, 24, also travels through the non-optical layers (i.e., the non-optical layers are placed in the path of light which travels through or is reflected by the optical layers 22, 24).

As a non-limiting example, the optical layers 22, 24 and the non-optical layers 28 of the multilayer optical film 20 may be made using polymers, such as polyesters. The term "polymer" includes polymers and copolymers, as well as polymers and/or copolymers which may be formed in a miscible blend, for example, by coextrusion or by reactions, including, for example, transesterification. Polyesters have carboxylate and glycol subunits which are generated by reactions of carboxylate monomer molecules with glycol monomer molecules. Each carboxylate monomer molecule has two or more carboxylic acid or ester functional groups and each glycol monomer molecule has two or more hydroxy functional groups. The carboxylate monomer molecules may all be the same or there may be two or more different types of molecules. The same applies to the glycol monomer molecules.

The properties of a polymer layer or film vary with the particular choice of monomer molecules. One example of a polyester useful in multilayer optical films is polyethylene naphthalate (PEN) which can be made, for example, by reactions of naphthalene dicarboxylic acid with ethylene glycol.

Suitable carboxylate monomer molecules for use in forming the carboxylate subunits of the polyester layers include, for example, 2,6-naphthalene dicarboxylic acid and isomers thereof; terephthalic acid; isophthalic acid; phthalic acid; azelaic acid; adipic acid; sebacic acid; norbornene dicarboxylic acid; bi-cyclooctane dicarboxylic acid; 1,b-cyclohexane dicarboxylic acid and isomers thereof; t-butyl isophthalic acid, tri-mellitic acid, sodium sulfonated isophthalic acid; 2,2'-biphenyl dicarboxylic acid and isomers thereof; and lower alkyl esters of these acids, such as methyl or ethyl esters. The term "lower alkyl" refers, in this context, to C1–C10 straight-chained or branched alkyl groups. Also included within the term "polyester" are polycarbonates which are derived from the reaction of glycol monomer molecules with esters of carbonic acid.

Suitable glycol monomer molecules for use in forming glycol subunits of the polyester layers include ethylene glycol; propylene glycol; 1,4-butanediol and isomers thereof; 1,6-hexanediol; neopentyl glycol; polyethylene glycol; diethylene glycol; tricyclodecanediol; 1,4-cyclohexanedimethanol and isomers thereof; norbornanediol; bicyclo-octanediol; trimethylol propane; pentaerythritol; 1,4-benzenedimethanol and isomers thereof; bisphenol A; 1,8-dihydroxy biphenyl and isomers thereof; and 1,3-bis(2-hydroxyethoxy)benzene.

Non-polyester polymers are also useful in creating polarizer or mirror films. For example, layers made from a polyester such as polyethylene naphthalate may be combined with layers made from an acrylic polymer to form a highly reflective mirror film. In addition, polyether imides may also be used with polyesters, such as PEN and coPEN, to generate a multilayer optical film 20. Other polyester/non-polyester combinations, such as polybutylene terephthalate and polyvinyl chloride, may also be used.

Multilayered optical films may also be made using only non-polyesters. For example, poly(methyl methacrylate) and polyvinylidene fluoride may be used to make layers for a multilayer optical film 20. Another non-polyester combination is atactic or syndiotactic polystyrene and polyphenylene oxide. Other combinations may also be used.

The first optical layers 22 are typically orientable polymer films, such as polyester films, which may be made birefringent by, for example, stretching the first optical layers 22 in a desired direction or directions. The term "birefringent" means that the indices of refraction in orthogonal x, y, and z directions are not all the same. For films or layers in a film, a convenient choice of x, y, and z axes is shown in FIG. 2 in which the x and y axes correspond to the length and width of the film or layer and the z axis corresponds to the thickness of the layer or film. In the embodiment illustrated in FIG. 2, the multilayer optical film 20 has several optical layers 22, 24 which are stacked one on top of the other in the z-direction.

The first optical layers 22 may be uniaxially-oriented, for example, by stretching in a single direction. A second orthogonal direction may be allowed to neck into some value less than its original length. In one embodiment, the direction of stretching substantially corresponds to either the x or y axis shown in FIG. 2. However, other directions may be chosen. A birefringent, uniaxially-oriented layer typically exhibits a difference between the transmission and/or reflection of incident light rays having a plane of polarization parallel to the oriented direction (i.e., stretch direction) and light rays having a plane of polarization parallel to a transverse direction (i.e., a direction orthogonal to the stretch direction). For example, when an orientable polyester film is stretched along the x axis, the typical result is that $n_x \neq n_y$, where $n_x$ and $n_y$ are the indices of refraction for light polarized in a plane parallel to the "x" and "y" axes, respectively. The degree of alteration in the index of refraction along the stretch direction will depend on factors such as the amount of stretching, the stretch rate, the temperature of the film during stretching, the thickness of the film, the variation in film thickness, and the composition of the film. Typically, the first optical layers 22 have an in-plane birefringence (the absolute value of $n_x - n_y$) after orientation of 0.04 or greater at 632.8 nm, preferably about 0.1 or greater, and more preferably about 0.2 or greater. All birefringence and index of refraction values are reported for 632.8 nm light unless otherwise indicated.

Polyethylene naphthalate (PEN) is an example of a useful material for forming the first optical layers 22 because it is highly birefringent after stretching. The refractive index of PEN for 632.8 nm light polarized in a plane parallel to the stretch direction increases from about 1.62 to as high as about 1.87. Within the visible spectrum, PEN exhibits a birefringence of 0.20 to 0.40 over a wavelength range of 400–700 nm for a typical high orientation stretch (e.g., a material stretched to five or more times its original dimension at a temperature of 130° C. and an initial strain rate of 20%/min).

The birefringence of a material can be increased by increasing the molecular orientation. Many birefringent materials are crystalline or semicrystalline. The term "crystalline" will be used herein to refer to both crystalline and semicrystalline materials. PEN and other crystalline polyesters, such as polybutylene naphthalate (PBN), polyethylene terephthalate (PET) and polybutylene terephthalate (PBT), are examples of crystalline materials useful in the construction of birefringent film layers such as is often the case for the first optical layers 22. In addition, some copolymers of PEN, PBN, PET, and PBT are also crystalline or semicrystalline. The addition of a comonomer to PEN, PBN, PET, or PBT may enhance other properties of the material including, for example, adhesion to the second optical layers 24 or the non-optical layers 28 and/or the lowering of the working temperature (i.e., the temperature for extrusion and/or stretching the film). Lowering the working temperature may increase the compatibility between the multilayer optical film 20 and a dichroic polarizer made from stained polyvinyl alcohol, in that the lower temperature may reduce the number and/or size of cracks in the dichroic polarizer.

Glass transition temperatures, which often determine the working temperature for many copolymers, including coPEN, can be roughly estimated by the Fox equation in which the reciprocal of the glass transition temperature (in degrees Kelvin) is the compositionally weighted average of the reciprocal glass transition temperatures of each component. For example, for low melt PEN with 70% naphthalate subunits and 30% terephthalate subunits:

$$1/T_{g(low\ melt\ PEN)} = 0.70(1/T_{g(PEN)}) + 0.30(1/T_{g(PET)})$$

$T_g$ of PEN is about 123° C. (396 K) and $T_g$ of PET (polyethylene terephthalate) is about 76° C. (349 K). In this exemplary case, $T_g$ is estimated to be around 108° C. (381 K) and, therefore, the glass transition temperature of this coPEN is estimated, by this method, to be lower by about 15° C. than the glass transition temperature of PEN. Typically, the processing temperature can be lowered by about the same amount. The estimates of the glass transition temperature using this method are typically very rough and are useful primarily for finding an expected range for the glass transition temperatures of copolymers.

Figure 4A:
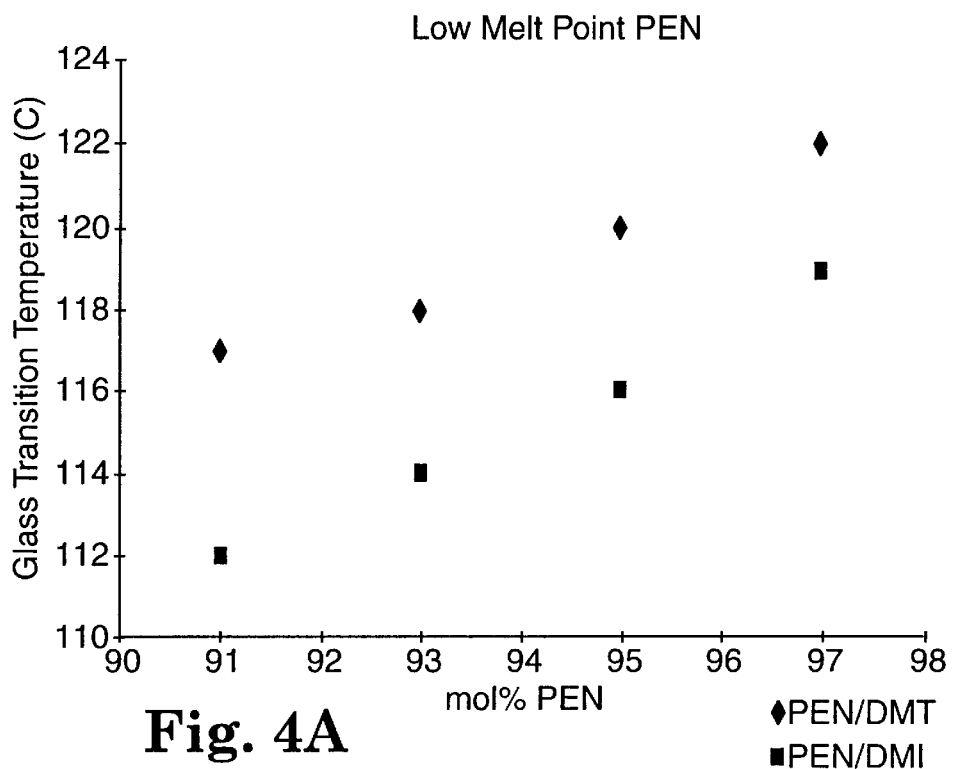
FIGS. 4A and 4B are graphs illustrating the decrease of glass transition temperature (FIG. 4A) and freezing temperature (FIG. 4B) with the addition of terephthalate (using dimethyl terephthalate (DMT)) and isophthalate (using dimethyl isophthalate (DMI)) subunits to polyethylene naphthalate (PEN) which is derived from dimethyl naphthalene dicarboxylate.
Figure 4B:
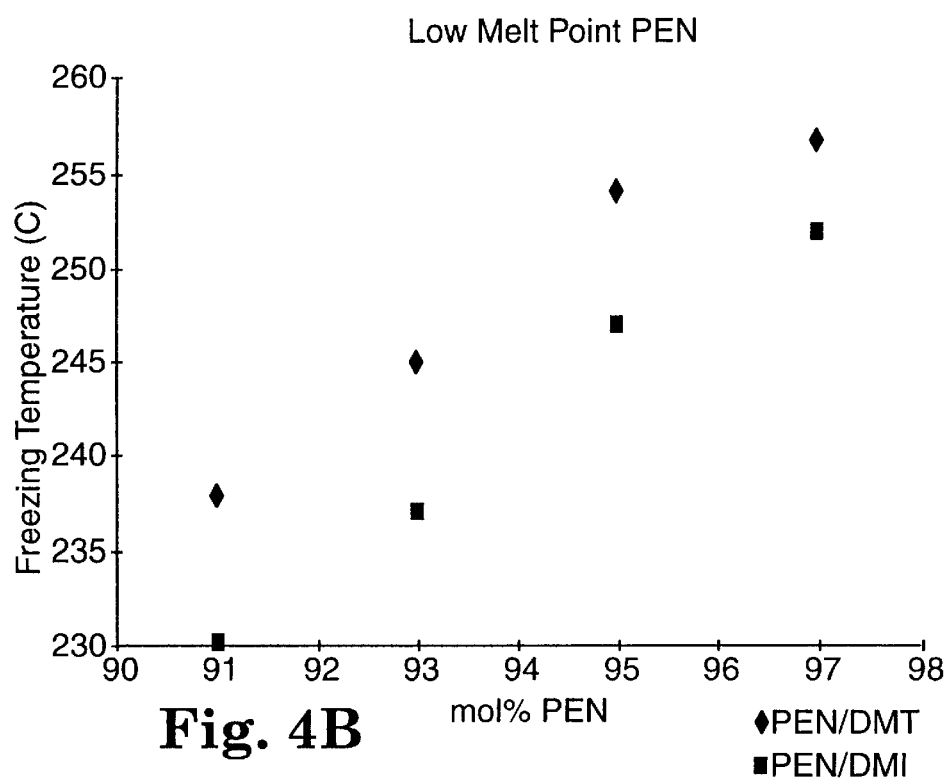

FIGS. 4A and 4B illustrate the reduction in glass transition temperature and freezing point temperature for the addition of 3 to 9 mol % isophthalate (derived from dimethyl isophthalate (DMI)) or terephthalate (derived from dimethyl terephthalate (DMT)) subunits. In general, the reduction in freezing point is typically greater than the change in the glass transition temperature for a given amount of substituted subunits. These measurements do not agree completely with estimated glass transition temperatures using the Fox equation, as described above, because of the imprecision in the measurements and the calculation.

Figure 5:
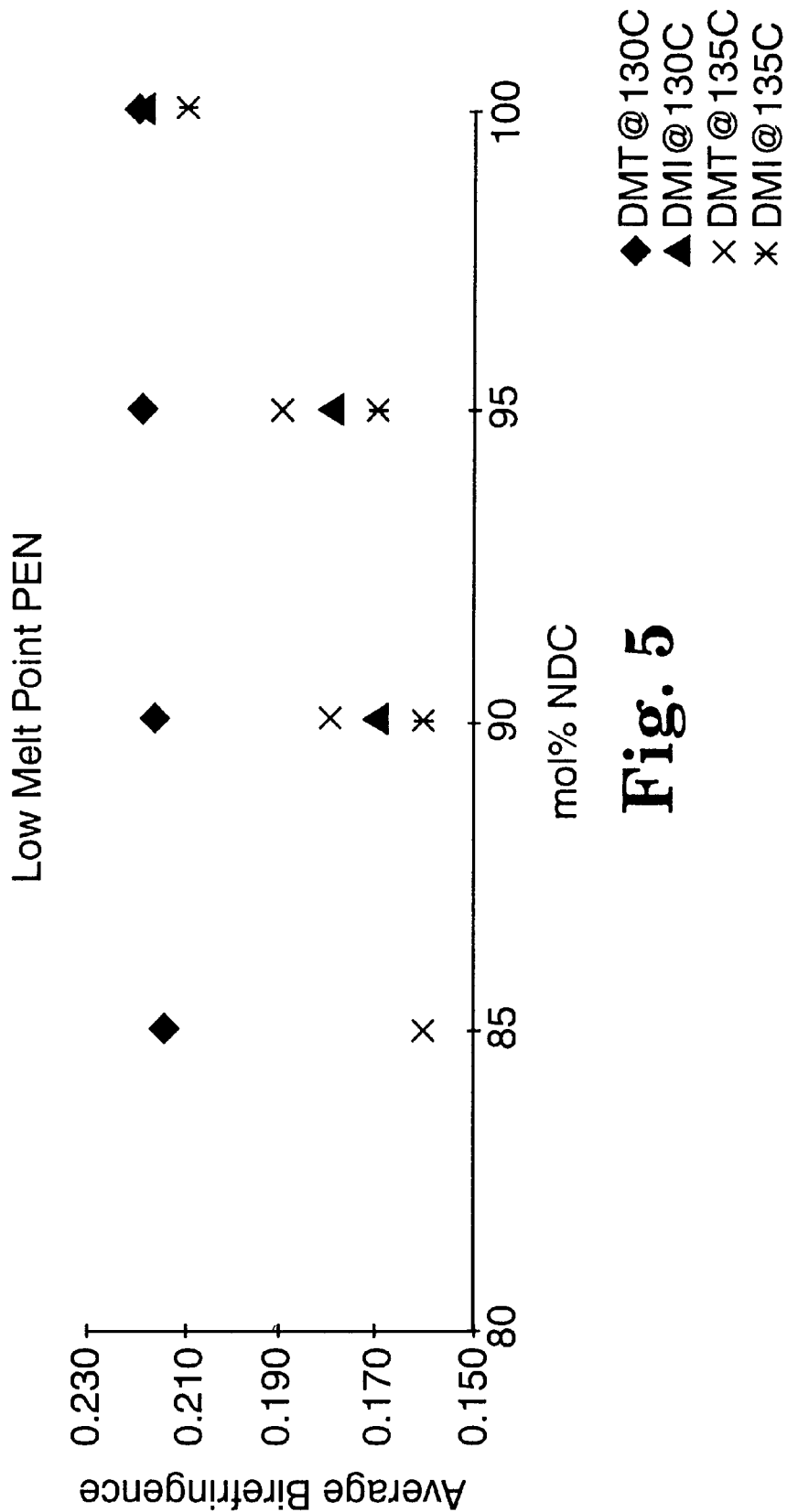
FIG. 5 is a graph of the average in-plane birefringence, at 632.8 nm, of coPEN with terephthalate and isophthalate subunits and oriented at relatively low temperatures.

FIG. 5 illustrates the average birefringence of a low melt point coPEN having 0 to 9 mol % terephthalate and isophthalate subunits. This low melt point coPEN typically also has better adhesion to second optical layers made from a coPEN which contains terephthalate and/or isophthalate subunits due to the presence of common monomer subunits.

In some embodiments, the first optical layers 22 are made from a semicrystalline, birefringent copolyester which includes 70 to 99 mol % of a first carboxylate subunit and 1 to 30 mol %, and preferably 5 to 15 mol %, of comonomer carboxylate subunits. The comonomer carboxylate subunits may be one or more of the subunits indicated hereinabove. Preferred first carboxylate subunits include naphthalate and terephthalate.

If the polyester material of the first optical layers 22 contains more than one type of carboxylate subunit, then the polyester may be a block copolyester to enhance adhesion to other layers (e.g., the second optical layers 24 or non-optical layers 28) made from block copolymers having similar blocks. Random copolyesters may also be used.

In other embodiments, the first optical layers 22 are made from a semicrystalline, birefringent copolyester which includes 70 to 99 mol % of a first glycol subunit and 1 to 30 mol %, and preferably 5 to 30 mol % of comonomer glycol subunits. The comonomer glycol subunits may be one or more of the subunits indicated hereinabove. Preferred first glycol subunits are derived from C2–C8 diols. More preferred first glycol subunits are derived from ethylene glycol or 1,4-butanediol.

Yet other embodiments include first optical layers 22 where both of the carboxylate and glycol subunits are mixed. For these embodiments, typically at least 0.5 mol %, and preferably at least 2.5 mol %, of the combined carboxylate and glycol subunits are comonomer carboxylate subunits, comonomer glycol subunits, or a combination thereof.

With the increasing addition of comonomer carboxylate and/or glycol subunits, the index of refraction in the orientation direction, typically the largest index of refraction, often decreases. Based on such an observation, this might lead to a conclusion that the birefringence of the first optical layers will be proportionately affected. However, it has been found that the index of refraction in the transverse direction also decreases with the addition of comonomer subunits. This results in substantial maintenance of the birefringence.

In many cases, a multilayer optical film 20 may be formed using first optical layers 22 that are made from a coPEN which has the same in-plane birefringence for a given draw ratio (i.e., the ratio of the length of the film in the stretch direction after stretching and before stretching) as a similar multilayered film formed using PEN for the first optical layers. The matching of birefringence values may be accomplished by the adjustment of processing parameters, such as the processing or stretch temperatures. Often coPEN optical layers have an index of refraction in the draw direction which is at least 0.02 units less than the index of refraction of the PEN optical layers in the draw direction. The birefringence is maintained because there is a decrease in the index of refraction in the non-draw direction.

In some embodiments of the multilayer optical film 20, the first optical layers 22 are made from a coPEN which has in-plane indices of refraction (i.e., $n_x$ and $n_y$) that are 1.83 or less, and preferably 1.80 or less, and which differ (i.e., $|n_x - n_y|$) by 0.15 units or more, and preferably 0.2 units or more, when measured using 632.8 nm light. PEN often has an in-plane index of refraction that is 1.84 or higher and the difference between the in-plane indices of refraction is about 0.22 to 0.24 or more when measured using 632.8 nm light. The in-plane refractive index differences, or birefringence, of the first optical layers 22, whether they be PEN or coPEN, may be reduced to less than 0.2 to improve properties, such as interlayer adhesion. Similar comparisons between suitable coPBN and coPET polymers for the first layers can be made with PBN and PET.

The second optical layers 24 may be made from a variety of polymers. Examples of suitable polymers include vinyl polymers and copolymers made from monomers such as vinyl naphthalenes, styrene, maleic anhydride, acrylates, and methacrylates. Examples of such polymers include polyacrylates, polymethacrylates, such as poly(methyl methacrylate) (PMMA), and isotactic or syndiotactic polystyrene. Other polymers include condensation polymers such as polysulfones, polyamides, polyurethanes, polyamic acids, and polyimides. In addition, the second optical layers 24 may be formed from polymers and copolymers such as polyesters and polycarbonates. The second optical layers 24 will be exemplified below by copolymers of polyesters. However, it will be understood that the other polymers described above may also be used. The same considerations with respect to optical properties for the copolyesters, as described below, will also typically be applicable for the other polymers and copolymers.

In some embodiments, the second optical layers 24 are uniaxially or biaxially orientable. However, more typically the second optical layers 24 are not oriented under the processing conditions used to orient the first optical layers 22. These second optical layers 24 typically retain a relatively isotropic index of refraction, even when stretched. Preferably, the second optical layers have a birefringence of less than about 0.04, and more preferably less than about 0.02 at 632.8 nm.

Examples of suitable materials for the second optical layers 24 are copolymers of PEN, PBN, PET, or PBT. Typically, these copolymers include carboxylate subunits which are 20 to 100 mol % second carboxylate subunits, such as naphthalate (for coPEN or coPBN) or terephthalate (for coPET or coPBT) subunits, and 0 to 80 mol % second comonomer carboxylate subunits. The copolymers also include glycol subunits which are 40 to 100 mol % second glycol subunits, such as ethylene (for coPEN or coPET) or butylene (for coPBN or coPBT), and 0 to 60 mol % second comonomer glycol subunits. At least about 10 mol % of the combined carboxylate and glycol subunits are second comonomer carboxylate or glycol subunits.

Figure 6:
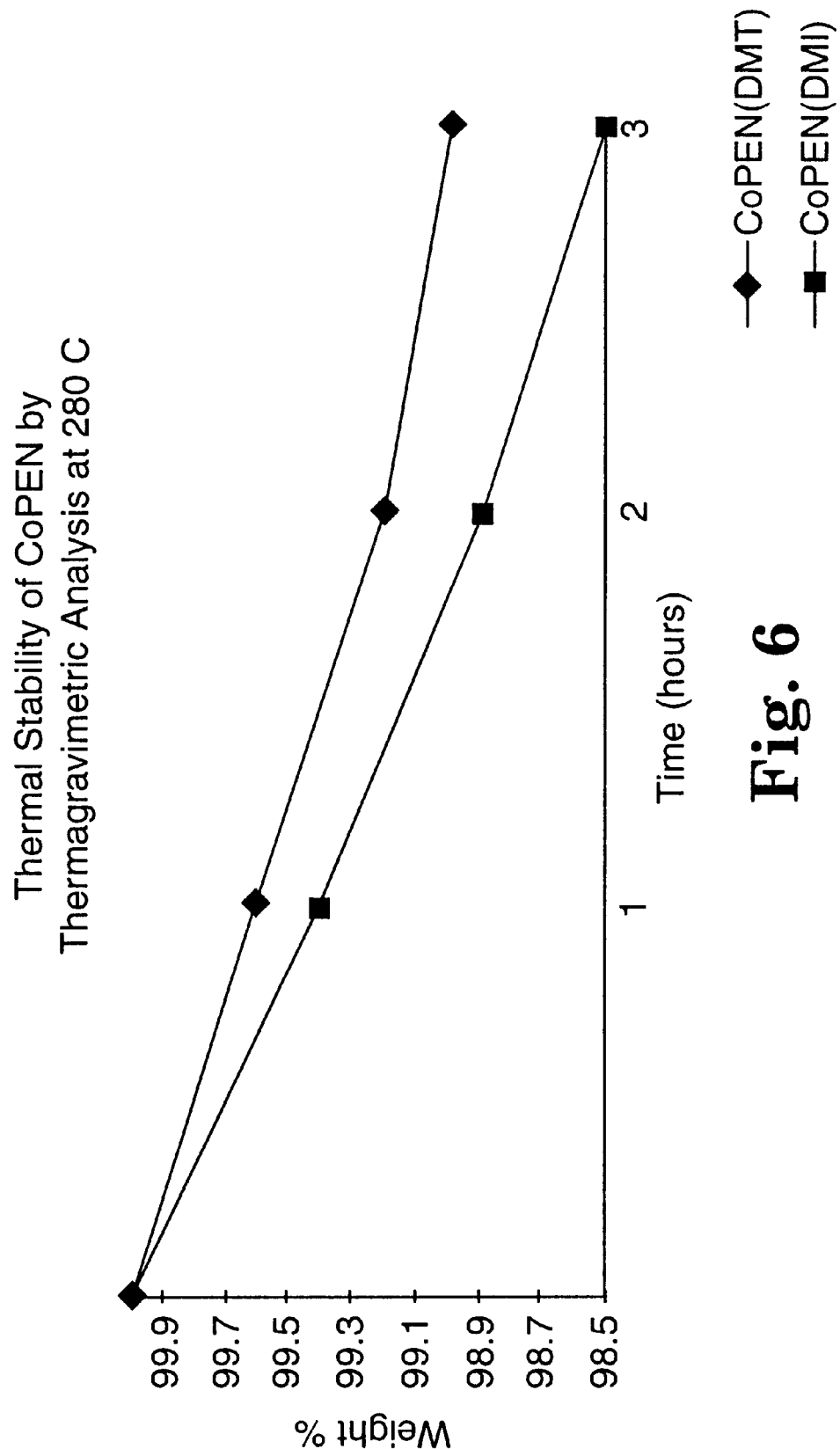
FIG. 6 is a graph of the thermal stability of coPEN containing terephthalate and isophthalate subunits.

One example of a polyester for use in second optical layers 24 is a low cost coPEN. One currently used coPEN has carboxylate subunits which are about 70 mol % naphthalate and about 30 mol % isophthalate. Low cost coPEN replaces some or all of the isophthalate subunits with terephthalate subunits. The cost of this polymer is reduced as dimethyl isophthalate, the typical source for the isophthalate subunits, currently costs considerably more than dimethyl terephthalate, a source for the terephthalate subunits. Furthermore, coPEN with terephthalate subunits tends to have greater thermal stability than coPEN with isophthalate subunits, as illustrated in FIG. 6.

However, substitution of terephthalate for isophthalate may increase the birefringence of the coPEN layer; so a combination of terephthalate and isophthalate may be desired. Low cost coPEN typically has carboxylate subunits in which 20 to 80 mol % of the carboxylate subunits are naphthalate, 10 to 60 mol % are terephthalate, and 0 to 50 mol % are isophthalate subunits. Preferably, 20 to 60% mol % of the carboxylate subunits are terephthalate and 0 to 20 mol % are isophthalate. More preferably, 50 to 70 mol % of the carboxylate subunits are naphthalate, 20 to 50 mol % are terephthalate, and 0 to 10 mol % are isophthalate subunits.

Figure 7:
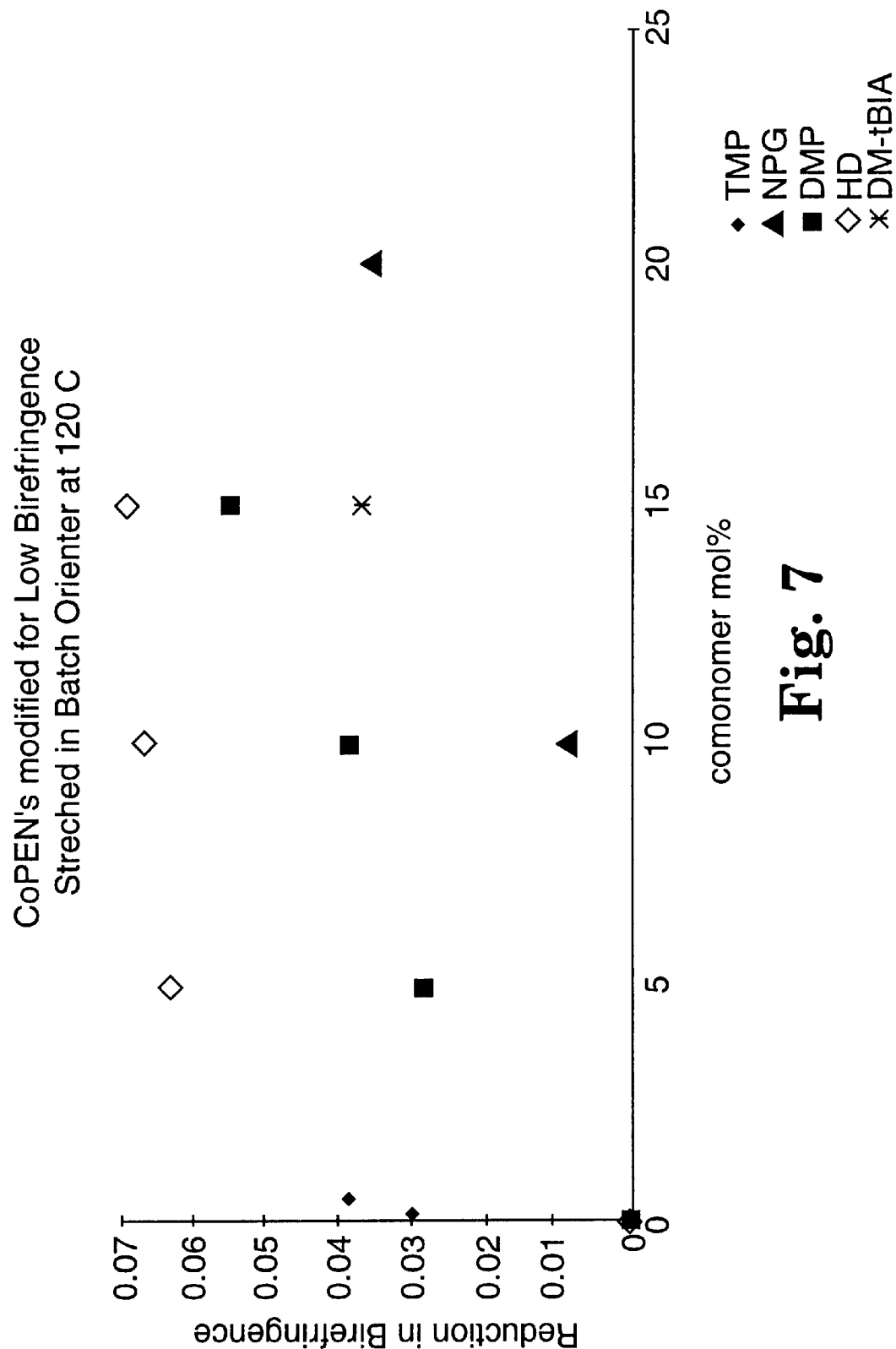
FIG. 7 is a graph illustrating the reduction of in-plane birefringence, at 632.8 nm, by the addition of comonomer subunits to coPEN.

Because coPENs may be slightly birefringent and orient when stretched, it may be desirable to produce a polyester composition for use with second optical layers 24 in which this birefringence is reduced. Low birefringent coPENs may be synthesized by the addition of comonomer materials. Examples of suitable birefringent-reducing comonomer materials for use as diol subunits are derived from 1,6-hexanediol, trimethylol propane, and neopentyl glycol. Examples of suitable birefringent-reducing comonomer materials for use as carboxylate subunits are derived from t-butyl-isophthalic acid, phthalic acid, and lower alkyl esters thereof. FIG. 7 is a graph illustrating the reduction in birefringence of coPEN by addition of these materials. This reduction may be 0.07 or higher at 632.8 nm when the second optical layers 24 have been drawn under high strain conditions (e.g., at a draw ratio at 5:1 or greater) or under a low draw temperature. By reducing birefringence, the addition of comonomers in the coPEN also increases the normal angle gain of the optical polarizer. Normal angle gain is a measure of the increase in light emitted from an LCD when the reflective polarizer is used in combination with an absorbing polymer.

Preferred birefringent-reducing comonomer materials are derived from t-butyl-isophthalic acid, lower alkyl esters thereof, and 1,6-hexanediol. Other preferred comonomer materials are trimethylol propane and pentaerythritol which may also act as branching agents, to form branches or crosslinks with other polymers. The comonomers may be distributed randomly in the coPEN polyester or they may form one or more blocks in a block copolymer.

Examples of low birefringent coPEN include glycol subunits which are derived from 70–100 mol % C2–C4 diols and about 0–30 mol % comonomer diol subunits derived from 1,6-hexanediol or isomers thereof; trimethylol propane; or neopentyl glycol and carboxylate subunits which are 20 to 100 mol % naphthalate, 0 to 80 mol % terephthalate or isophthalate subunits or mixtures thereof, and 0 to 30 mol % of comonomer carboxylate subunits derived from phthalic acid, t-butyl-isophthalic acid, or lower alkyl esters thereof Furthermore, the low birefringence coPEN has at least 0.5 to 5 mol % of the combined carboxylate and glycol subunits which are comonomer carboxylate or glycol subunits.

The addition of comonomer subunits derived from compounds with three or more carboxylate, ester, or hydroxy functionalities may also decrease the birefringence of the copolyester of the second layers. These compounds act as branching agents to form branches or crosslinks with other polymer molecules. In some embodiments of the invention, the copolyester of the second layer includes 0.01 to 5 mol %, preferably 0.1 to 2.5 mol %, of these branching agents.

One particular polymer has glycol subunits that are derived from 70 to 99 mol % C2–C4 diols and about 1 to 30 mol % comonomer subunits derived from 1,6-hexanediol and carboxylate subunits that are 5 to 99 mol % naphthalate, 1 to 95 mol % terephthalate, isophthalate, or mixtures thereof, and 0 to 30 mol % comonomer carboxylate subunits derived from one or more of phthalic acid, t-butyl-isophthalic acid, or lower alkyl esters thereof In addition, at least 0.01 to 2.5 mol % of the combined carboxylate and glycol subunits of this copolyester are branching agents.

Because birefringence typically decreases with molecular weight, another useful polyester is a low molecular weight coPEN. The low molecular weight coPEN has an intrinsic viscosity of 0.4 to 0.5 dL/g. The intrinsic viscosity of the polymer is retained by the addition of between about 0.5 to 5 mol % of monomers having three or more carboxylate, ester, and/or hydroxy groups. These monomers often act as branching agents. The molecular weight of the polymer is established by ending the polymerization at a specified melt viscosity determined by, for example, the power draw on a reactor agitator, agitator speed, and melt temperature. Typically, non-optical layers having an intrinsic viscosity of 0.5 dL/g or greater are used with this low molecular weight coPEN to provide structural support.

Figure 8:
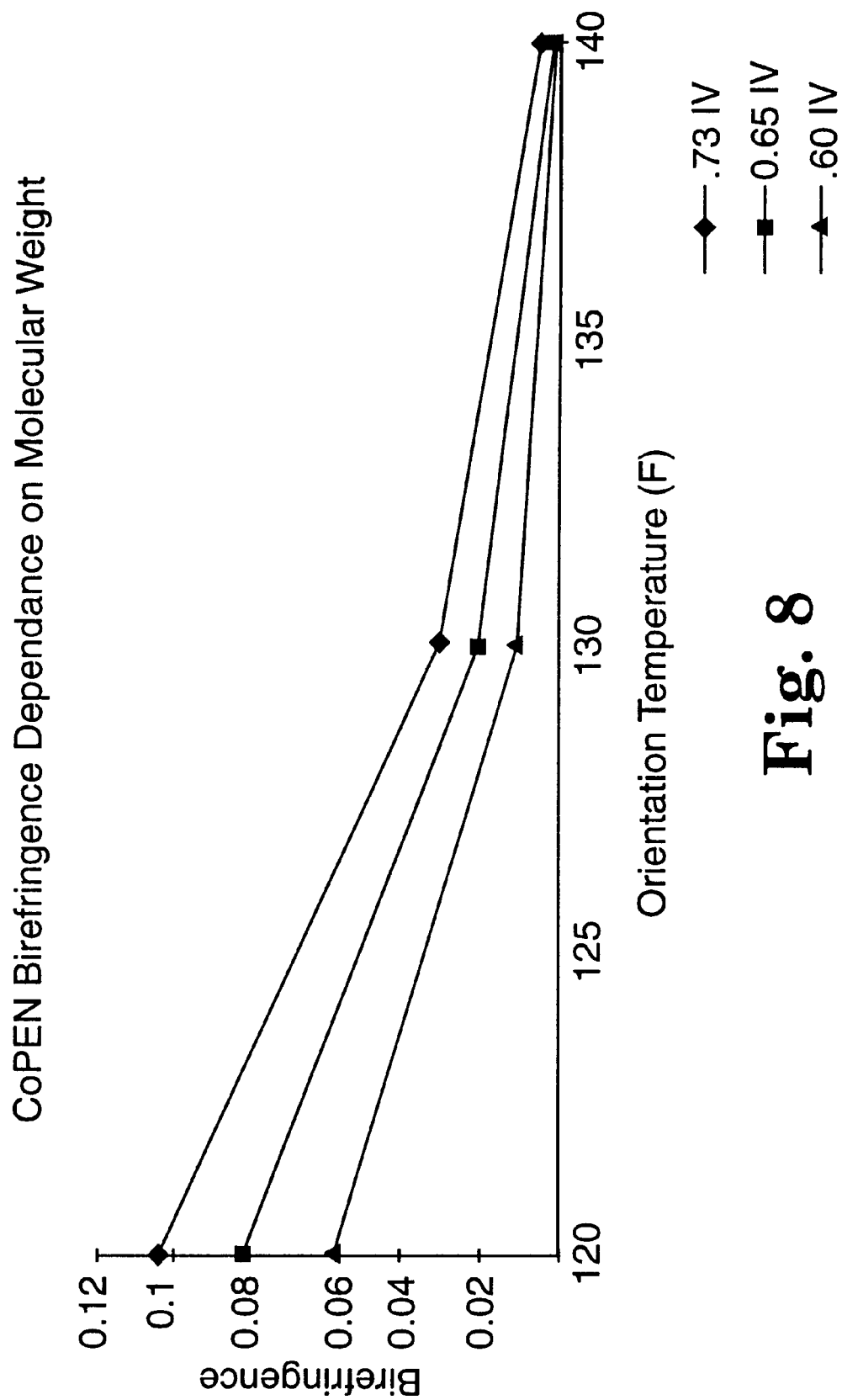
FIG. 8 is a graph illustrating the dependence of in-plane birefringence, at 632.8 nm, on molecular weight.

Suitable monomers for use as branching agents in increasing the melt viscosity of a low molecular weight coPEN include alcohols with more than two hydroxy functionalities, as well as carboxylic acids with more than two carboxylic acid functionalities and lower alkyl esters thereof. Examples of suitable branching monomers include trimethylol propane, pentaerythritol, or trimellitic acid. FIG. 8 illustrates the decrease in birefringence with decrease in molecular weight (as measured by decrease in intrinsic viscosity).

Another type of useful copolyester includes cyclohexane dicarboxylate subunits. These copolyesters are especially useful as low refractive index polymers due to their viscoelastic properties which enable stable multilayer coextrusion with polyethylene naphthalate in the first optical layers 22. In contrast, some other aliphatic copolyesters with low refractive indices do not have the rheological properties necessary to provide stable melt flow when coextruded in a multilayer melt manifold with polyethylene naphthalate. Cyclohexane dicarboxylate also may provide improved thermal stability over other low refractive index copolyesters during coextrusion.

Tertiary-butyl isophthalate is a preferred carboxylate subunit for use with cyclohexane dicarboxylate in effectively improving glass transition temperature and modulus of the copolyester without substantially increasing refractive indices. Tertiary-butyl isophthalate enables copolyesters of cyclohexane dicarboxylate to have glass transition temperatures above room temperature with refractive indices as low as 1.51 at 632.8 nm. Utilizing branching monomers such as trimethylol propane enables high viscosity polymers to be synthesized from these monomers without the need for large amounts of catalyst or long reaction times, which improves color and clarity of the polymer. Thus, non-birefringent copolyesters with low refractive indices may be produced with cyclohexane dicarboxylate and tertiary-butyl isophthalate providing the carboxylate subunits, and ethylene glycol and trimethylol propane providing the glycol subunits. These copolyesters are useful for making multilayer optical films which retain their physical properties at room temperature.

Copolyesters made using naphthalene dicarboxylate and cyclohexane dicarboxylate as carboxylates can be coextruded with polyethylene naphthalate to form a multilayer optical film with good interlayer adhesion. Scrap from this multilayer optical film may be ground into flake and extruded in a twin screw extruder, where it mixes well and transesterifies to form a new copolyester with higher naphthalate content. This scrap may be recycled.

One embodiment of the invention includes second optical layers made from a polyester with carboxylate subunits derived from cyclohexane dicarboxylate. Preferably, the polyester has carboxylate subunits derived from 5 to 95 mol % dimethyl cyclohexane dicarboxylate and 5 to 95 mol % dimethyl tertiary-butyl isophthalate and glycol subunits derived from 85 to 99.99 mol % C2–C4 diols and 0.01 to 5 mol % trimethylol propane. More preferably, the polyester has carboxylate subunits derived from 50 to 85 mol % dimethyl cyclohexane dicarboxylate and 15 to 50 mol % dimethyl tertiary-butyl isophthalate and glycol subunits derived from 98 to 99.99 mol % C2–C4 diols and 0.01 to 2 mol % trimethylol propane.

The non-optical layers 28 may also be made from copolyesters similar to the second optical layers 24, using similar materials and similar amounts of each material. In addition, other polymers may also be used, as described above with respect to the second optical layers 24. It has been found that the use of coPEN (i.e., a copolymer of PEN) or other copolymer material for skin layers (as seen in FIG. 2) reduces the splittiness (i.e., the breaking apart of a film due to strain-induced crystallinity and alignment of a majority of the polymer molecules in the direction of orientation) of the multilayer optical film, because the coPEN of the skin layers orients very little when stretched under the conditions used to orient the first optical layers 22.

Preferably, the polyesters of the first optical layers 22, the second optical layers 24, and the non-optical layers 28 are chosen to have similar rheological properties (e.g., melt viscosities) so that they can be co-extruded. Typically, the second optical layers 24 and the non-optical layers 28 have a glass transition temperature, $T_g$, that is either below or no greater than about 40° C. above the glass transition temperature of the first optical layers 22. Preferably, the glass transition temperature of the second optical layers 24 and the non-optical layers 28 is below the glass transition temperature of the first optical layers 22.

A polarizer may be made by combining a uniaxially-oriented first optical layer 22 with a second optical layer 24 having an isotropic index of refraction that is approximately equal to one of the in-plane indices of the oriented layer. Alternatively, both optical layers 22,24 are formed from birefringent polymers and are oriented in a multiple draw process so that the indices of refraction in a single in-plane direction are approximately equal. The interface between the two optical layers 22,24, in either case, forms a light reflection plane. Light polarized in a plane parallel to the direction in which the indices of refraction of the two layers are approximately equal will be substantially transmitted. Light polarized in a plane parallel to the direction in which the two layers have different indices will be at least partially reflected. The reflectivity can be increased by increasing the number of layers or by increasing the difference in the indices of refraction between the first and second layers 22, 24.

Typically, the highest reflectivity for a particular interface occurs at a wavelength corresponding to twice the combined optical thickness of the pair of optical layers 22, 24 which form the interface. The optical thickness of the two layers is $n_1 d_1 + n_2 d_2$ where $n_1$, $n_2$ are the indices of refraction of the two layers and $d_1$, $d_2$ are the thicknesses of the layers. The layers 22, 24 may each be a quarter wavelength thick or the layers 22, 24 may have different optical thicknesses, so long as the sum of the optical thicknesses is half of a wavelength (or a multiple thereof). A multilayer optical film having a plurality of layers may include layers with different optical thicknesses to increase the reflectivity of the film over a range of wavelengths. For example, a multilayer optical film may include pairs of layers which are individually tuned to achieve optimal reflection of light having particular wavelengths.

Alternatively, the first optical layers 22 may be biaxially-oriented by stretching in two different directions. The stretching of optical layers 22 in the two directions may result in a net symmetrical or asymmetrical stretch in the two chosen orthogonal axes.

One example of the formation of a mirror is the combination of a biaxially-oriented optical layer 22 with a second optical layer 24 having indices of refraction which differ from both the in-plane indices of the biaxially-oriented layer. The mirror operates by reflecting light having either polarization because of the index of refraction mismatch between the two optical layers 22, 24. Mirrors may also be made using a combination of uniaxially-oriented layers with in-plane indices of refraction which differ significantly. In another embodiment, the first optical layers 22 are not birefringent and a mirror is formed by combining first and second optical layers 22, 24 which have significantly different indices of refraction. Reflection occurs without orientation of the layers. There are other methods and combinations of layers that are known for producing both mirrors and polarizers and which may be used. Those particular combinations discussed above are merely exemplary.

The second optical layers 24 may be prepared with a variety of optical properties depending, at least in part, on the desired operation of the multilayer optical film 20. In one embodiment, the second optical layers 24 are made of a polymer material that does not appreciably optically orient when stretched under conditions which are used to orient the first optical layers 22. Such layers are particularly useful in the formation of reflective polarizing films, because they allow the formation of a stack 26 of layers by, for example, coextrusion, which can then be stretched to orient the first optical layers 22 while the second optical layers 24 remain relatively isotropic. Typically, the index of refraction of the second optical layers 24 is approximately equal to one of the indices of the oriented first optical layers 22 to allow transmission of light with a polarization in a plane parallel to the direction of the matched indices. Preferably, the two approximately equal indices of refraction differ by about 0.05 or less, and more preferably by about 0.02 or less, at 632.8 nm. In one embodiment, the index of refraction of the second optical layers 24 is approximately equal to the index of refraction of the first optical layers 22 prior to stretching.

In other embodiments, the second optical layers 24 are orientable. In some cases, the second optical layers 24 have one in-plane index of refraction that is substantially the same as the corresponding index of refraction of the first optical layers 22 after orientation of the two sets of layers 22, 24, while the other in-plane index of refraction is substantially different than that of the first optical layers 22. In other cases, particularly for mirror applications, both in-plane indices of refraction of the optical layers 22, 24 are substantially different after orientation.

Figure 3:
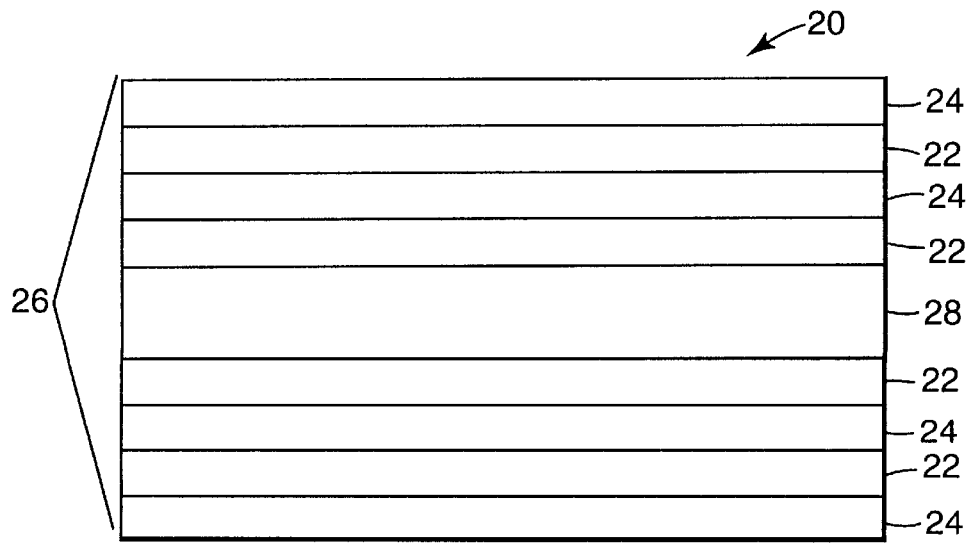
FIG. 3 is a side elevational view of another embodiment of a multilayer optical film for use in the optical device of FIG. 1.

Referring again to FIGS. 2 and 3, one or more of the non-optical layers 28 may be formed as a skin layer over at least one surface of stack 26 as illustrated in FIG. 2, to, for example, protect the optical layers 22, 24 from physical damage during processing and/or afterwards. In addition, one or more of non-optical layers 28 may be formed within the stack 26 of layers, as illustrated in FIG. 3, to, for example, provide greater mechanical strength to the stack or to protect the stack during processing.

The non-optical layers 28 ideally do not significantly participate in the determination of optical properties of the multilayer optical film 20, at least across the wavelength region of interest. The non-optical layers 28 are typically not birefringent or orientable but in some cases this may not be true. Typically, when the non-optical layers 28 are used as skin layers there will be at least some surface reflection. If the multilayer optical film 20 is to be a polarizer, the non-optical layers preferably have an index of refraction which is relatively low. This decreases the amount of surface reflection. If the multilayer optical film 20 is to be a mirror, the non-optical layers 28 preferably have an index of refraction which is high, to increase the reflection of light.

When the non-optical layers 28 are found within the stack 26, there will typically be at least some polarization or reflection of light by the non-optical layers 28 in combination with the optical layers 22, 24 adjacent to the non-optical layers 28. Typically, however, the non-optical layers 28 have a thickness which dictates that light reflected by the non-optical layers 28 within the stack 26 has a wavelength in the infrared region.

Various functional layers or coatings may be added to the optical films and devices of the present invention to alter or improve their physical or chemical properties, particularly along the surface of the film or device. Such layers or coatings may include, for example, slip agents, low adhesion backside materials, conductive layers, antistatic coatings or films, barrier layers, flame retardants, UV stabilizers, abrasion resistant materials, optical coatings, compensation films, retardation films, diffuse adhesives, and/or substrates designed to improve the mechanical integrity or strength of the film or device.

Skin layers or coatings may also be added to impart desired barrier properties to the resulting film or device. Thus, for example, barrier films or coatings may be added as skin layers, or as a component in skin layers, to alter the transmissive properties of the film or device towards liquids, such as water or organic solvents, or gases, such as oxygen or carbon dioxide.

Skin layers or coatings may also be added to impart or improve abrasion resistance in the resulting article. Thus, for example, a skin layer comprising particles of silica embedded in a polymer matrix may be added to an optical film produced in accordance with the invention to impart abrasion resistance to the film, provided, of course, that such a layer does not unduly compromise the optical properties required for the application to which the film is directed.

Skin layers or coatings may also be added to impart or improve puncture and/or tear resistance in the resulting article. Factors to be considered in selecting a material for a tear resistant layer include percent elongation to break, Young's modulus, tear strength, adhesion to interior layers, percent transmittance and absorbance in an electromagnetic bandwidth of interest, optical clarity or haze, refractive indices as a function of frequency, texture and roughness, melt thermal stability, molecular weight distribution, melt rheology and coextrudability, miscibility and rate of interdiffusion between materials in the skin and optical layers, viscoelastic response, relaxation and crystallization behavior under draw conditions, thermal stability at use temperatures, weatherability, ability to adhere to coatings and permeability to various gases and solvents. Puncture or tear resistant skin layers may be applied during the manufacturing process or later coated onto or laminated to the multilayer optical film. Adhering these layers to the film during the manufacturing process, such as by a coextrusion process, provides the advantage that the film is protected during the manufacturing process. In some embodiments, one or more puncture or tear resistant layers may be provided within the film, either alone or in combination with a puncture or tear resistant skin layer.

The films and optical devices of the present invention may be given good slip properties by treating them with low friction coatings or slip agents, such as polymer beads coated onto the surface. Alternately, the morphology of the surfaces of these materials may be modified, as through manipulation of extrusion conditions, to impart a slippery surface to the film; methods by which surface morphology may be so modified are described in U.S. patent application Ser. No. 08/612,710.

In some applications, as where the optical films of the present invention are to be used as a component in adhesive tapes, it may be desirable to treat the films with low adhesion backsize (LAB) coatings or films such as those based on urethane, silicone or fluorocarbon chemistry. Films treated in this manner will exhibit proper release properties towards pressure sensitive adhesives (PSAs), thereby enabling them to be treated with adhesive and wound into rolls. Adhesive tapes made in this manner can be used for decorative purposes or in any application where a diffusely reflective or transmissive surface on the tape is desirable.

The films and optical devices of the present invention may also be provided with one or more conductive layers. Such conductive layers may include metals such as silver, gold, copper, aluminum, chromium, nickel, tin, and titanium, metal alloys such as silver alloys, stainless steel, and inconel, and semiconductor metal oxides such as doped and undoped tin oxides, zinc oxide, and indium tin oxide (ITO).

The films and optical devices of the present invention may also be provided with antistatic coatings or films. Such coatings or films include, for example, $V_2O_5$ and salts of sulfonic acid polymers, carbon or other conductive metal layers.

The films and devices of the present invention may also be provided with one or more barrier films or coatings that alter the transmissive properties of the film towards certain liquids or gases. Thus, for example, the devices and films of the present invention may be provided with films or coatings that inhibit the transmission of water vapor, organic solvents, $O_2$, or $CO_2$ through the film. Barrier coatings may be particularly desirable in high humidity environments, where components of the film or device may be subject to distortion due to moisture permeation.

The films and optical devices of the present invention may also be treated with flame retardants, particularly when used in environments, such as on airplanes, that are subject to strict fire codes. Suitable flame retardants include aluminum trihydrate, antimony trioxide, antimony pentoxide, and flame retarding organophosphate compounds.

The films and optical devices of the present invention may also be provided with abrasion-resistant or hard coatings, which may be applied as a skin layer. These include acrylic hardcoats such as Acryloid A-11 and Paraloid K-120N, available from Rohm & Haas, Philadelphia, Pa.; urethane acrylates, such as those described in U.S. Pat. No. 4,249,011 and those available from Sartomer Corp., Westchester, Pa.; and urethane hardcoats obtained from the reaction of an aliphatic polyisocyanate (e.g., Desmodur N-3300, available from Miles, Inc., Pittsburgh, Pa.) with a polyester (e.g., Tone Polyol 0305, available from Union Carbide, Houston, Tex.).

The films and optical devices of the present invention may further be laminated to rigid or semi-rigid substrates, such as, for example, glass, metal, acrylic, polyester, and other polymer backings to provide structural rigidity, weatherability, or easier handling. For example, the multilayer optical films 20 may be laminated to a thin acrylic or metal backing so that it can be stamped or otherwise formed and maintained in a desired shape. For some applications, such as when the film is applied to other breakable backings, an additional layer comprising PET film or puncture-tear resistant film may be used.

The films and optical devices of the present invention may also be provided with shatter resistant films and coatings. Films and coatings suitable for this purpose are described, for example, in publications EP 592284 and EP 591055, and are available commercially from 3M Company, St. Paul, Minn.

Various optical layers, materials, and devices may also be applied to, or used in conjunction with, the films and devices of the present invention for specific applications. These include, but are not limited to, magnetic or magneto-optic coatings or films; liquid crystal panels, such as those used in display panels and privacy windows; photographic emulsions; fabrics; prismatic films, such as linear Fresnel lenses; brightness enhancement films; holographic films or images; embossable films; anti-tamper films or coatings; IR transparent films for low emissivity applications; release films or release coated paper; compensation films; retardation films; diffuse adhesives; and polarizers or mirrors.

Multiple additional layers on one or both major surfaces of the multilayer optical film 20 are contemplated, and can be any combination of the aforementioned coatings or films. For example, when an adhesive is applied to the multilayer optical film 20, the adhesive may contain a white pigment such as titanium dioxide to increase the overall reflectivity, or it may be optically transparent to allow the reflectivity of the substrate to add to the reflectivity of the multilayer optical film 20.

In order to improve roll formation and convertibility of the film, the multilayer optical films of the present invention may also include a slip agent that is incorporated into the film or added as a separate coating. In most applications, slip agents are added to only one side of the film, ideally the side facing the rigid substrate in order to minimize haze.

The films and other optical devices made in accordance with the invention may also include one or more anti-reflective layers or coatings, such as, for example, conventional vacuum coated dielectric metal oxide or metal/metal oxide optical films, silica sol gel coatings, and coated or coextruded anti-reflective layers such as those derived from low index fluoropolymers such as THV, an extrudable fluoropolymer available from 3M Company (St. Paul, Minn.). Such layers or coatings, which may or may not be polarization sensitive, serve to increase transmission and to reduce reflective glare, and may be imparted to the films and optical devices of the present invention through appropriate surface treatment, such as coating or sputter etching.

The films and other optical devices made in accordance with the invention may be provided with a film or coating which imparts anti-fogging properties. In some cases, an anti-reflection layer as described above will serve the dual purpose of imparting both anti-reflection and anti-fogging properties to the film or device. Various anti-fogging agents are known to the art. Typically, however, these materials include substances, such as fatty acid esters, which impart hydrophobic properties to the film surface and which promote the formation of a continuous, less opaque film of water.

Coatings which reduce the tendency for surfaces to "fog" have been reported by several inventors. For example, U.S. Pat. No. 3,212,909 to Leigh discloses the use of ammonium soap, such as alkyl ammonium carboxylates in admixture with a surface active agent which is a sulfated or sulfonated fatty material, to produce a anti-fogging composition. U.S. Pat. No. 3,075,228 to Elias discloses the use of salts of sulfated alkyl aryloxypolyalkoxy alcohol, as well as alkylbenzene sulfonates, to produce an anti-fogging article useful in cleaning and imparting anti-fogging properties to various surfaces. U.S. Pat. No. 3,819,522 to Zmoda, discloses the use of surfactant combinations comprising derivatives of decyne diol as well as surfactant mixtures which include ethoxylated alkyl sulfates in an anti-fogging window cleaner surfactant mixture. Japanese Patent Kokai No. Hei 6[1994] 41,335 discloses a clouding and drip preventive composition comprising colloidal alumina, colloidal silica and an anionic surfactant. U.S. Pat. No. 4,478,909 (Taniguchi et al) discloses a cured anti-fogging coating film which comprises polyvinyl alcohol, a finely divided silica, and an organic silicon compound, the carbon/silicon weight ratio apparently being important to the film's reported anti-fogging properties. Various surfactants, include fluorine-containing surfactants, may be used to improve the surface smoothness of the coating. Other anti-fog coatings incorporating surfactants are described in U.S. Pat. Nos. 2,803,552; 3,022,178; and 3,897,356. PCT 96/18,691 (Scholtz et al) discloses means by which coatings may impart both anti-fog and anti-reflective properties.

The films and optical devices of the present invention may be protected from UV radiation through the use of UV stabilized films or coatings. Suitable UV stabilized films and coatings include those which incorporate benzotriazoles or hindered amine light stabilizers (HALS) such as Tinuvin™ 292, both of which are available commercially from Ciba Geigy Corp., Hawthorne, N.Y. Other suitable UV stabilized films and coatings include those which contain benzophenones or diphenyl acrylates, available commercially from BASF Corp., Parsippany, N.J. Such films or coatings may be particularly desirable when the films and optical devices of the present invention are used in outdoor applications or in luminaires where the source emits significant amount of light in the UV region of the spectrum.

The films and optical devices of the present invention may be treated with inks, dyes, or pigments to alter their appearance or to customize them for specific applications. Thus, for example, the films may be treated with inks or other printed indicia such as those used to display product identification, advertisements, warnings, decoration, or other information. Various techniques may be used to print on the film, such as screen printing, letterpress, offset, flexographic printing, stipple printing, laser printing, and so forth, and various types of ink can be used, including one and two component inks, oxidatively drying and UV-drying inks, dissolved inks, dispersed inks, and 100% ink systems. In addition, a dye or pigment may be blended in with a polymer during any portion of the processing.

The appearance of the multilayer optical film may also be altered by coloring the film, such as by laminating a dyed film to the multilayer optical film, applying a pigmented coating to the surface of the film, or including a pigment in one or more of the materials used to make the film.

Both visible and near IR dyes and pigments are contemplated in the present invention, and include, for example, optical brighteners such as dyes that absorb in the UV and fluoresce in the visible region of the color spectrum. Other additional layers that may be added to alter the appearance of the optical film include, for example, opacifying (black) layers, diffusing layers, holographic images or holographic diffusers, and metal layers. Each of these may be applied directly to one or both surfaces of film, or may be a component of a second film or foil construction that is laminated to the film. Alternately, some components such as opacifying or diffusing agents, or colored pigments, may be included in an adhesive layer which is used to laminate the film to another surface.

The films and devices of the present invention may also be provided with metal coatings. Thus, for example, a metallic layer may be applied directly to the optical film by pyrolysis, powder coating, vapor deposition, cathode sputtering, ion plating, and the like. Metal foils or rigid metal plates may also be laminated to the optical film, or separate polymeric films or glass or plastic sheets may be first metallized using the aforementioned techniques and then laminated to the films and devices of the present invention.

A brief description of one method for forming multilayer polymer films is described. A fuller description of the process conditions and considerations is found in U.S. Patent Application entitled "Process for Making Multilayer Optical Film" filed on even date by applicants under Attorney Docket No. 51932USA8A, incorporated herein by reference. The multilayer polymer films are formed by extrusion of polymers to be used in the first and second optical layers, as well as the non-optical layers. Extrusion conditions are chosen to adequately feed, melt, mix and pump the polymer resin feed streams in a continuous and stable manner. Final melt stream temperatures are chosen to be within a range which reduces freezing, crystallization or unduly high pressure drops at the low end of the range and which reduces degradation at the high end of the range. The entire melt stream processing of more than one polymer, up to and including film casting on a chill roll, is often referred to as co-extrusion.

Following extrusion, each melt stream is conveyed through a neck tube into a gear pump used to regulate the continuous and uniform rate of polymer flow. A static mixing unit may be placed at the end of the neck tube to carry the polymer melt stream from the gear pump into a multilayer feedblock with uniform melt stream temperature. The entire melt stream is typically heated as uniformly as possible to enhance both uniform flow of the melt stream and reduce degradation during melt processing.

Multilayer feedblocks divide each of two or more polymer melt streams into many layers, interleave these layers, and combine the many layers into a single multilayer stream. The layers from any given melt stream are created by sequentially bleeding off part of the stream from a main flow channel into side channel tubes which lead to layer slots in the feed block manifold. The layer flow is often controlled by choices made in machinery, as well as the shape and physical dimensions of the individual side channel tubes and layer slots.

The side channel tubes and layer slots of the two or more melt streams are often interleaved to, for example, form alternating layers. The feedblock's downstream-side manifold is often shaped to compress and uniformly spread the layers of the combined multilayer stack transversely. Thick, non-optical layers, known as protective boundary layers (PBLs), may be fed near the manifold walls using the melt streams of the optical multilayer stack, or by a separate melt stream. As described above, these non-optical layers may be used to protect the thinner optical layers from the effects of wall stress and possible resulting flow instabilities.

The multilayer stack exiting the feedblock manifold may then enter a final shaping unit such as a die. Alternatively, the stream may be split, preferably normal to the layers in the stack, to form two or more multilayer streams that may be recombined by stacking. The stream may also be split at an angle other than normal to the layers. A flow channeling system that splits and stacks the streams is called a multiplier. The width of the split streams (i.e., the sum of the thicknesses of the individual layers) can be equal or unequal. The multiplier ratio is defined as the ratio of the wider to narrower stream widths. Unequal streams widths (i.e., multiplier ratios greater than unity) can be useful in creating layer thickness gradients. In the case of unequal stream widths, the multiplier may spread the narrower stream and/or compress the wider stream transversely to the thickness and flow directions to ensure matching layer widths upon stacking.

Prior to multiplication, additional non-optical layers can be added to the multilayer stack. These non-optical layers may perform as PBLs within the multiplier. After multiplication and stacking, some of these layers may form internal boundary layers between optical layers, while others form skin layers.

After multiplication, the web is directed to the final shaping unit. The web is then cast onto a chill roll, sometimes also referred to as a casting wheel or casting drum. This casting is often assisted by electrostatic pinning, the details of which are well-known in the art of polymer film manufacture. The web may be cast to a uniform thickness across the web or a deliberate profiling of the web thickness may be induced using die lip controls.

The multilayer web is then drawn to produce the final multilayer optical film. In one exemplary method for making a multilayer optical polarizer, a single drawing step is used. This process may be performed in a tenter or a length orienter. Typical tenters draw transversely (TD) to the web path, although certain tenters are equipped with mechanisms to draw or relax (shrink) the film dimensionally in the web path or machine direction (MD). Thus, in this exemplary method, a film is drawn in one in-plane direction. The second in-plane dimension is either held constant as in a conventional tenter, or is allowed to neck in to a smaller width as in a length orienter. Such necking in may be substantial and increase with draw ratio.

In one exemplary method for making a multilayer mirror, a two step drawing process is used to orient the birefringent material in both in-plane directions. The draw processes may be any combination of the single step processes described that allow drawing in two in-plane directions. In addition, a tenter that allows drawing along MD, e.g. a biaxial tenter which can draw in two directions sequentially or simultaneously, may be used. In this latter case, a single biaxial draw process may be used.

In still another method for making a multilayer polarizer, a multiple drawing process is used that exploits the different behavior of the various materials to the individual drawing steps to make the different layers comprising the different materials within a single coextruded multilayer film possess different degrees and types of orientation relative to each other. Mirrors can also be formed in this manner.

The intrinsic viscosity of the polyesters used in these layers and films is related to the molecular weight (in the absence of branching monomers) of the polymer. Typically, the polyesters have an intrinsic viscosity of greater than about 0.4 dL/g. Preferably, the intrinsic viscosity is between about 0.4 to 0.7 dL/g. Intrinsic viscosity, for purposes of this disclosure, is measured in a 60/40 wt. % phenol/o-dichlorobenzene solvent at 30° C. unless otherwise indicated.

Dichroic Polarizing Films

There are a variety of dichroic polarizers. One particularly useful dichroic polarizer 11 is a polyvinyl alcohol (PVA) film. These films, upon incorporation of a dye material, are well-known in the art and have been used successfully as dichroic polarizers. To function as a dichroic polarizer, the polyvinyl alcohol film is typically stretched to orient the film and then stained. The orientation of the film determines the optical properties (e.g., the axis of extinction) of the film.

The film may be made by a variety of techniques. One method for making the film includes mixing the polyvinyl alcohol in a solvent, typically, water, to form a solution with about 5 to 30% solids. The solution is then applied to a substrate and dried at a temperature between about 100° C. and about 120° C. The film is stretched to orient the polyvinyl alcohol.

The invention is directed to optical polarizers and in particular to dichroic polarizers. The invention is also directed to the formation of these polarizers and to their use with other optical elements, such as reflective polarizers, mirrors, and IR mirrors.

Conventional dichroic polarizers 11 are often made from polyvinyl alcohol films. These films are well-known in the art and have been used, upon incorporation of a dye material, as dichroic polarizers. To function as a dichroic polarizer, the polyvinyl alcohol film is stretched to orient the film and then stained. The orientation of the film determines the optical properties (e.g., the axis of extinction) of the film. One use of these films is in conjunction with the multilayer optical films describe above which are often also stretched to orient one or more layers.

Unfortunately, polyvinyl alcohol films tend to crack under the stretching conditions used in the formation of many multilayer optical films, for example, those made from multilayer polyester films, and in particular, polyester films containing naphthalate subunits such as PEN. Although no particular theory is necessary to the invention, it is thought that polyvinyl alcohol forms a hydrogen-bonded network which is incapable of stretching under these conditions while maintaining its structural integrity. The hydrogen-bonded network is strained and, finally, at one or more points slips, thereby causing cracks. Experimentation indicates that small molecule plasticizers do not solve this problem.

It has been found that the addition of a second polymer that is dispersible or soluble in a solvent used in the formation of the polyvinyl alcohol film significantly reduces cracking and improves adhesion of the dichroic polymer to the substrate. The second polymer is included as either a dispersion or a solution, depending on the nature of the second polymer, and the terms "dispersion" and "solution" will be used interchangeably herein. The second polymer is preferably water-soluble as water is a common solvent for polyvinyl alcohol. More preferably, the second polymer is a polar polymer. Suitable second polymers include, for example, polyvinyl pyrrolidone and polyesters soluble or dispersible in the solvent of the polyvinyl alcohol. Examples of water-soluble or water dispersible polyesters include sulfonated polyesters, such as those describe in U.S. Pat. No. 5,427,835, incorporated herein by reference. Suitable co-solvents include, for example, polar solvents such as C1–C4 alcohols.

Typically, the polyvinyl alcohol and second polymer are mixed in a ratio of between 5:1 and 100:1 by weight, and preferably between 8:1 and 20:1 by weight. The solution is typically 1 to 50 wt. % solids, and preferably 5 to 25 wt. % solids. Although no particular theory is necessary to the invention, it is thought that the addition of the second polymer separates the hydrogen-bonded network into a large number of domains which may move relative to each other when strained, thereby relieving the strain and reducing the amount of cracking.

The polyvinyl alcohol film may be made by a variety of techniques. One exemplary method for making the film includes combining the polyvinyl alcohol and the second polymer in a solvent according to the above-mentioned ratios and weight percentages. This dispersion/solution of the two polymers is then applied to the surface of a substrate. The substrate may be another film, a multilayer stack, a plastic object, or any other surface which allows stretching of the polyvinyl alcohol film. Application of the dispersion/solution may be accomplished by a variety of known methods, including, for example, coating the substrate using techniques, such as shoe coating, extrusion coating, roll coating, curtain coating, or any other coating method capable of providing a uniform coating. The substrate may be coated with a primer or an adhesive or the substrate may be treated with a corona discharge to help anchor the polyvinyl alcohol film to the substrate. Typically, the thickness of the coating is 25 to 500 $\mu$m when wet and preferably 50 to 125 $\mu$m. After coating, the polyvinyl alcohol film is dried at a temperature typically between 100° C. and 150° C. The film is then stretched using, for example, length orienters or tenter clips to orient the film. In some embodiments, the film is removed from the substrate. The film may then be adhered to another surface, if desired. The polyvinyl alcohol film can then be used as a dichroic polarizer when stained. However, it will be understood that other uses may be made of the polyvinyl alcohol film.

A finished polyvinyl alcohol film typically includes a dichroic dye material to form a dichroic polarizer. The dichroic dye material may include dyes, pigments, and the like. Suitable dye materials for use in the dichroic polarizer film include, for example, iodine, as well as anthraquinone and azo dyes, such as Congo Red (sodium diphenyl-bis-$\alpha$-naphthylamine sulfonate), methylene blue, stilbene dye (Color Index (CI)=620), and 1,1'-diethyl-2,2'-cyanine chloride (CI=374 (orange) or CI=518 (blue)). The properties of these dyes, and methods of making them, are described in E. H. Land, Colloid Chemistry (1946). Still other dichroic dyes, and methods of making them, are discussed in the Kirk Othmer Encyclopedia of Chemical Technology, Vol. 8, pp. 652–661 (4th Ed. 1993), and in the references cited therein.

The dichroic dye material may be added to the dispersion of the polyvinyl alcohol and second polymer prior to coating. Alternatively, a polyvinyl alcohol film may be stained with a staining composition, such as, for example, an iodine-containing solution. The staining of the polyvinyl alcohol film may occur before or after the film is drawn. In some cases, the dichroic dye material may not be able to withstand the drawing conditions and should therefore be applied to the polyvinyl alcohol film after drawing.

One example of a suitable staining composition is an iodine-containing solution. The iodine stained film may be stabilized using, for example, a boron-containing composition, such as a boric acid/borax solution. Other stains may require different stabilizers. The concentrations of the staining or stabilizing compositions, as well as the temperature at which the staining or stabilization occurs and the time of contact with each solution, may vary widely without compromising the stain.

Various other components may be added to the solution of polyvinyl alcohol and the second polymer. For example, a surfactant may be added to facilitate wetting of the substrate. A wide variety of surfactants may be used, including, for example, Triton X-100 (Union Carbide Chemicals and Plastics Company, Inc., Danbury, Conn.). The surfactant is typically about 1% or less of the solution, and preferably about 0.5% or less. The surfactant is preferably nonionic so that it does not interfere with polar groups on the polymer.

Another optional additive is a drying aid which facilitates film formation on drying. Example of a suitable drying aids includes N-methyl-pyrrolidone and butyl carbitol. The drying aid is typically about 10% or less of the solution, and preferably about 5% or less.

In addition, an adhesive may be applied to the polyvinyl alcohol film to adhere the film to the substrate. This may be particularly useful when the polyvinyl alcohol film is removed from a first substrate and then placed on a second substrate. A variety of adhesives may be used including, for example, resins and pressure sensitive adhesives (PSA). When choosing a suitable adhesive, the optical properties of the adhesive are usually considered. Other coatings may also be used including, for example, hard coatings to protect the film from environmental damage, release liners, and primer coatings to enhance adhesion to a substrate.

The addition of a second polymer to the polyvinyl alcohol film provides an improved dichroic polarizer which is compatible with the simultaneous orientation of the polyvinyl alcohol film and a multilayer optical film, such as a reflective polarizer or mirror film. The advantage of using the improved dichroic polarizer is that the dichroic and multilayer optical film may be oriented together, thereby forming, for example, an optical polarizer which may have dichroic and reflective elements that are more perfectly aligned. Furthermore, the addition of a second polymer to the polyvinyl alcohol film often improves the adhesion of the film to a substrate.

An exemplary process for forming optical devices includes, first, forming a multilayer optical film, as described above. This multilayer optical film is coated or laminated with the polyvinyl alcohol film, either with or without the second polymer, using well-known devices, such as, for example, shoe coating, extrusion coating, roll coating, curtain coating, or any other coating method capable of providing a uniform coating.

The multilayer optical film and the polyvinyl alcohol film are then simultaneously drawn to form an oriented multilayer optical film and an oriented polyvinyl alcohol film. In some embodiments, the multilayer optical film is drawn multiple times. In these embodiments, the polyvinyl alcohol film is often coated or laminated on the multilayer optical film prior to the final draw. In alternative embodiments, the two films may be drawn and oriented separately. Known devices may be used to draw the two films, including, for example, tenters or long orienters. Drawing the polyvinyl alcohol film and the multilayer optical film together typically results in the orientation axis of the polyvinyl alcohol layer being coincident with the axis of final orientation of the multilayer optical film, which may be either a polarizer film or a mirror film. Dichroic dye material may be added prior to drawing the films, or may be incorporated later by, for example, staining the polyvinyl alcohol film, as described above.

A number of different combinations of dichroic polarizer and multilayer polymer films may be formed. For example, an visible band dichroic and reflective polarizer combination, an IR band mirror and dichroic polarizer combination, an IR band polarizer and dichroic polarizer combination, among others, may be formed.

EXAMPLES

Monomers, catalysts, and stabilizers utilized in creating polymers for these examples are commercially available from the following suppliers: dimethyl naphthalene dicarboxylate and terephthalic acid from Amoco (Decatur, Ala.), dimethyl terephthalate from Hoechst Celanese (Dallas, Tex.), dimethyl isophthalate and dimethyl tertiary-butyl isophthalate from Morflex Inc. (Greensboro, N.C.), ethylene glycol from Union Carbide (Charleston, W. Va.), 1,6-hexanediol from BASF (Charlotte, N.C.), sebacic acid from Union Camp (Dover, Ohio), antimony triacetate from Elf Atochem (Philadelphia, Pa.), cobalt acetate and manganese acetate from Hall Chemical (Wickliffe, Ohio), triethyl phosphonoacetate from Albright & Wilson (Glen Allen, Va.), dimethyl cyclohexane dicarboxylate from Eastman Chemical Co. (Kingsport, Tennessee), and triethylamine from Air Products (Phillipsburg, N.J.).

In each of the examples described below, an 836 layer film is formed. The 836 optical layer construction includes four multilayer optical stacks of graded layer thicknesses as obtained by the double multiplication of a 209 layer construction from a multilayer feed block. The optical layers account for approximately 50 percent of the thickness of the construction. Each of the stacks is separated by one of three non-optical internal protective boundary layers, each accounting for about 2% of the total thickness. Finally, each side of the film possesses an outer non-optical skin layer, each accounting for approximately 22% of the thickness. Assisted by electrostatic pinning, the film is cast on a chilled roll at about 15° C. Prior to drawing, the film is referred to as a "cast web."

Several tests and measured quantities are common to the examples. The contrast is defined as the ratio of the transmission of light in the "pass" state (i.e., the transmission polarization) of the polarizer to the transmission of light in the "block" state (i.e., the extinction polarization). An Oriel spectrophotometer was used. The transmission was flat averaged (i.e., without any weighting) across the visible spectrum. The contrast was measured on the combined dichroic/reflective polarizer construction.

The dichroic ratio is a measure of the performance of the dichroic polarizer. It is estimated by measuring the pass and block transmission of the PVA coated multilayer film before and after staining with iodine and fixing with boric acid to form the dichroic polarizer. Some error is introduced by measuring equivalent stained and unstained samples rather than the exact same sample before and after staining. The normalized pass transmission is the ratio of the pass transmission of the stained sample to the pass transmission of the coated but unstained sample. The normalized block transmission is the ratio of the block transmission of the stained sample to the block transmission of the coated but unstained sample. The dichroic ratio is the logarithm of the normalized block transmission divided by the logarithm of the normalized pass transmission.

Adhesion between the dichroic and reflective polarizer layers is characterized using a crosshatched tape pull adhesion test. The sample is placed on a clean hard surface. Using a template with 1/8" slots spaced ever 1/4", the sample is scribed with a scribing tool to produce a crosshatched pattern. The scribe must go through the coating to the substrate without going all the way through the substrate. A 4" strip of 1" wide Scotch Brand #610 tape (3M Co., St. Paul, Minn.) is placed on the diagonal to the crosshatched pattern. Using the template, the tape is stripped from the sample. The tape should be stripped at a low angle to the sample surface. The procedure is now repeated with a new strip of tape. The sample is examined for coating removal. If no coating has been removed, the sample has passed the test. Otherwise, the sample has failed the test.

Comparative Example
Polarizing Film with PEN/coPEN (70/0/30).

As a comparative example, a multilayer reflective polarizer film was constructed with first optical layers created from polyethylene naphthalate and second optical layers created from co(polyethylene naphthalate) with carboxylate subunits derived from 70 mol % dimethyl naphthalene dicarboxylate and 30 mol % dimethyl isophthalate, and glycol subunits derived from 100 mol % ethylene glycol.

The polyethylene naphthalate used to form the first optical layers was synthesized in a batch reactor with the following raw material charge: 136 kg dimethyl naphthalene dicarboxylate, 73 kg ethylene glycol, 27 g manganese acetate, 27 g cobalt acetate, and 48 g antimony triacetate. Under pressure of 2 atmospheres, this mixture was heated to 254° C. while removing methanol (a transesterification reaction by-product). After 35 kg of methanol was removed, 49 g of triethyl phosphonoacetate was charged to the reactor and than the pressure was gradually reduced to 1 torr while heating to 290° C. The condensation reaction by-product, ethylene glycol, was continuously removed until a polymer with an intrinsic viscosity of 0.48 dL/g, as measured in 60/40 wt. % phenol/o-dichlorobenzene, was produced.

The co(polyethylene naphthalate) used to form the second optical layers was synthesized in a batch reactor with the following raw material charge: 109 kg dimethyl naphthalene dicarboxylate, 37 kg dimethyl isophthalate, 79 kg ethylene glycol, 29 g manganese acetate, 29 g cobalt acetate, and 58 g antimony triacetate. Under pressure of 2 atm, this mixture was heated to 254° C. while removing methanol. After 41 kg of methanol was removed, 52 g of triethyl phosphonoacetate was charged to the reactor and then the pressure was gradually reduced to 1 torr while heating to 290° C. The condensation reaction by-product, ethylene glycol, was continuously stripped until a polymer with an intrinsic viscosity of 0.57 dL/g, as measured in 60/40 wt. % phenol/o-dichlorobenzene, was produced.

The above described PEN and coPEN were then coextruded through a multilayer melt manifold to create a multilayer film with 836 alternating first and second optical layers. This multilayer reflective film also contains internal protective layers and external protective layers made of the same co(polyethylene naphthalate) as the second optical layers. These protective layers were introduced through additional melt ports. The film was cast on a chill roll.

A water solution containing 10 wt. % Airvol 107 polyvinyl alcohol (Air Products, Allentown, Pa.) and 0.1 wt. % Triton X-100 (Union Carbide, Danbury, Conn.) was coated onto this multilayer cast web with a shoe coater which delivered a wet coating thickness of 64 μm (2.50 mils) of the solution. The coating was dried at 105° C. for 1 minute.

The multilayer cast web and the polyvinyl alcohol film were fed into a tenter oven heated with hot air charged at 160° C. After preheating for about one minute, the combined construction was simultaneously uniaxially drawn in a tenter oven zone heated with hot air charged at 150° C. to 6:1 over 35 seconds. The films were then heated for 85 seconds prior to quenching the film to produce an optical polarizer having a thickness of approximately 125 μm.

The coating exhibited gross cracking defects that blanketed the film. The construction failed a crosshatched tape pull adhesion test.

Example 1
Polarizing Film with coPEN (85/15/0)/coPEN (50/0/50) layers.

A multilayer reflective polarizer film was constructed with first optical layers created from a co(polyethylene naphthalate) with carboxylate subunits derived from 85 mol % dimethyl naphthalene dicarboxylate and 15 mol % dimethyl terephthalate, and glycol subunits derived from 100 mol % ethylene glycol, and second optical layers created from a co(polyethylene naphthalate) with carboxylate subunits derived from 50 mol % dimethyl naphthalene dicarboxylate and 50 mol % dimethyl isophthalate, and glycol subunits derived from 100 mol % ethylene glycol.

The co(polyethylene naphthalate) used to form the first optical layers was synthesized in a batch reactor with the following raw material charge: 123 kg dimethyl naphthalene dicarboxylate, 17 kg dimethyl terephthalate, 76 kg ethylene glycol, 27 g manganese acetate, 27 g cobalt acetate, and 48 g antimony triacetate. Under pressure of 2 atm, this mixture was heated to 254° C. while removing methanol. After 36 kg of methanol was removed, 49 g of triethyl phosphonoacetate was charged to the reactor and than the pressure was gradually reduced to 1 torr while heating to 290° C. The condensation reaction by-product, ethylene glycol, was continuously removed until a polymer with an intrinsic viscosity of 0.51 dL/g, as measured in 60/40 wt. % phenol/o-dichlorobenzene, was produced.

The co(polyethylene naphthalate) was used to form the second optical layers was synthesized in a batch reactor with the following raw material charge: 77 kg dimethyl naphthalene carboxylate, 61 kg dimethyl isophthalate, 82 kg ethylene glycol, 27 grams manganese acetate, 27 grams cobalt acetate, and 48 g antimony triacetate. Under pressure of 2 atm, this mixture was heated to 254° C. while removing methanol. After 39.6 kg of methanol was removed, 49 g of triethyl phosphonoacetate was charged to the reactor and than the pressure was gradually reduced to 1 torr while heating to 290° C. The condensation reaction by-product, ethylene glycol, was continuously stripped until a polymer with an intrinsic viscosity of 0.60 dL/g, as measured in 60/40 wt. % phenol/o-dichlorobenzene, was produced.

The above coPENS are then coextruded to form an 836 multilayer cast web as previously described.

A water solution containing 14 wt. % Airvol 107 polyvinyl alcohol (Air Products, Allentown, Pa.) and 0.1 wt. %

Triton X-100 (Union Carbide, Danbury, Conn.) was coated onto the corona treated multilayer cast web with a shoe coater which delivered a wet coating thickness of 64 μm (2.5 mils) of the solution. The coating was dried at 105° C. for 1 minute.

The multilayer cast web and the polyvinyl alcohol film were fed into a tenter oven heated with hot air charged at 130° C. After preheating for about one minute, the combined construction was simultaneously uniaxially drawn to 6:1 over 35 seconds. The films were then heated for 85 seconds prior to quenching the construction to produce an optical polarizer have a thickness of approximately 125 μm. The construction exhibited only a low level of isolated nonspecific defects upon exiting the tenter. These defects may have resulted from the incorporation of foreign material or air bubbles in the film.

The construction with the polyvinyl alcohol coating was stained in an aqueous iodine/potassium iodide solution at 35° C. for 20 sec. The staining solution contained 0.4 wt. % iodine and 21 wt. % potassium iodide. The stain was fixed in a bath of boric acid/borax at 65° C. for 25 sec. The fixing solution contained 4.5 wt. % boric acid.

Average transmission in the pass state of the polarizer was about 84%. Contrast in the final construction was about 300. The dichroic ratio was about 30. The construction failed a crosshatched tape pull adhesion test.

Example 2

A multilayer reflective polarizer film was constructed with first optical layers created from a co(polyethylene naphthalate) with carboxylate subunits derived from 80 mol % dimethyl naphthalene dicarboxylate and 20 mol % dimethyl terephthalate, and glycol subunits derived from 100 mol % ethylene glycol, and second optical layers created from a co(polyethylene naphthalate) with carboxylate subunits derived from 55 mol % dimethyl naphthalene dicarboxylate and 45 mol % dimethyl terephthalate, and glycol subunits derived from 96.8 mol % ethylene glycol, 3.0 mol % hexanediol, and 0.2 mol % trimethylol propane.

The co(polyethylene naphthalate) used to form the first optical layers was created as a blend of two polymers: a PET (4.8 wt. %) and a coPEN (95.2 wt. %). The PET used in the blend was synthesized in a batch reactor with the following raw material charge: 138 kg dimethyl terephthalate, 93 kg ethylene glycol, 27 g zinc acetate, 27 g cobalt acetate, and 48 g antimony triacetate. Under pressure of 2 atm, this mixture was heated to 254° C. while removing the transesterification reaction byproduct, methanol. After 45 kg of methanol was removed 52 g of triethyl phosphonoacetate was charged to the reactor and then the pressure was gradually reduced to 1 torr while heating to 290° C. The condensation reaction byproduct, ethylene glycol, was continuously removed until a polymer with an intrinsic viscosity of 0.60, as measured in 60/40 wt. % phenol/o-dichlorobenzene, was produced.

The coPEN used in the blend to form the first optical layers had carboxylate subunits that were derived from 85 mol % dimethyl naphthalene dicarboxylate and 15 mol % dimethyl terephthalate and glycol subunits derived from 100 mol % ethylene glycol. The coPEN was synthesized as described in Example 1.

The co(polyethylene naphthalate) used to form the second optical layers was synthesized in a batch reactor with the following raw material charge: 88.5 kg dimethyl naphthalene dicarboxylate, 57.5 kg dimethyl terephthalate, 81 kg ethylene glycol, 4.7 kg hexane diol, 15 grams manganese acetate, 22 grams cobalt acetate, 15 g zinc acetate, 239 g trimethylol propane, and 51 g antimony triacetate. Under pressure of 2 atm, this mixture was heated to 254° C. while removing methanol. After 39.6 kg of methanol was removed, 47 g of triethyl phosphonoacetate was charged to the reactor and than the pressure was gradually reduced to 1 torr while heating to 290° C. The condensation reaction by-product, ethylene glycol, was continuously stripped until a polymer with an intrinsic viscosity of 0.56 dL/g, as measured in 60/40 wt. % phenol/o-dichlorobenzene, was produced.

The above described coPEN's were then coextruded through a multilayer melt manifold to create a multilayer cast web with 836 alternating first and second optical layers. This particular multilayer reflective film also contained internal and external protective layers made of the same co(polyethylene naphthalate) as the second optical layers.

A water solution containing 10 wt. % Airvol 107 polyvinyl alcohol (Air Products, Allentown, Pa.) and 0.1 wt. % Triton X-100 (Union Carbide, Danbury, Conn.) was coated onto the corona treated multilayer film with a shoe coater which delivered a wet coating thickness of 64 μm (2.50 mils) of the solution. The coating was dried at 105° C. for 1 minute.

The multilayer film and the polyvinyl alcohol film were fed into a tenter oven heated with hot air charged at 130° C. After preheating for about one minute, the combined construction was simultaneously uniaxially drawn to 6:1 over 35 seconds. The films were then heated for 85 seconds prior to quenching the reaction to produce an optical polarizer have a thickness of approximately 125 μm. The dichroic polarizer film was clear with a few isolated, non-specific defects.

The film was stained in an aqueous iodine/potassium iodide solution at 35° C. for 20 sec. The staining solution contained 0.4 wt. % iodine and 21 wt. % potassium iodide. The stained was fixed in a bath of boric acid/borax at 65° C. for 25 sec. The fixing solution contained 4.5 wt. % borax and 14.5 wt. % boric acid.

Transmission in the pass state was about 84%. Contrast in the final construction was about 100. The dichroic ratio was about 28. The construction failed a crosshatched tape pull adhesion test.

Example 3

A multilayer optical web was cast as in example 1. An aqueous solution containing 9 wt. % Airvol 107 polyvinyl alcohol (Air Products, Allentown, Pa.), 1 wt. % WB54 (a sulfonated polyester from 3M Co., St. Paul, Minn.), 3 wt. % N-methylpyrrolidone (available from Aldrich, Milwaukee, Wis.) and 0.1 wt. % Triton X-100 (Union Carbide, Danbury, Conn.) was coated onto an unoriented multilayer polyester cast web, having four stacks of 209 optical layers each, using a shoe coater which delivered a wet coating thickness of 64 μm (2.50) mils of the polyvinyl alcohol solution. The coating was dried at 105° C. for 1 minute.

The multilayer reflective polarizer film and the polyvinyl alcohol film were fed into a tenter oven heated with hot air charged at 130° C. After preheating for about one minute, the combined construction was simultaneously uniaxially drawn to 6:1 over 35 seconds. The films were then heated for 85 seconds prior to quenching the reaction to produce an optical polarizer have a thickness of approximately 125 μm.

The construction was slightly hazy and exhibited only a low level of isolated, non-specific defects. The construction with the polyvinyl alcohol film was stained in an aqueous iodine/potassium iodide solution at 35° C. for 20 sec. The staining solution contained 0.4 wt. % iodine and 21 wt. % potassium iodide. The stain was fixed in a bath of boric acid/borax at 65° C. for 25 sec. The fixing solution contained 4.5 wt. % borax and 14.5 wt. % boric acid.

The contrast in the final construction was about 170. The dichroic ratio was about 22. The construction passed a crosshatched tape pull adhesion test.

A variation of this example included drawing the construction to 7:1 rather than 6:1. Again the construction was slightly hazy and exhibited only a low level of isolated, non-specific defects. The construction was stained and fixed. The pass state transmission was about 72% and the contrast was about 1000. The dichroic ratio was about 22. This sample passed a crosshatched tape pull adhesion test.

Example 4

A multilayer optical web was cast according to the comparative example. The cast web was coated according to example 3 except that the multilayer reflective polarizer and polyvinyl alcohol film containing a second polymer were preheated in a tenter oven zone heated with hot air charged at 160° C. and then drawn at 150° C. rather than 130° C. The combined construction was then drawn according to the comparative example, stained and fixed.

The construction was slightly hazy after coating and exhibited only a low level of isolated, non-specific defects. Transmission in the pass state was about 78%. The contrast was about 200 and the dichroic ratio was about 22. The construction passed a crosshatched tape pull adhesion test.

The present invention should not be considered limited to the particular examples described above, but rather should be understood to cover all aspects of the invention as fairly set out in the attached claims. Various modifications, equivalent processes, as well as numerous structures to which the present invention may be applicable will be readily apparent to those of skill in the art to which the present invention is directed upon review of the present specification. The claims are intended to cover such modifications and devices.

We claim:

1. An optical polarizer, comprising:
   a dichroic polarizer; and
   a reflective polarizer positioned in the same optical path as the dichroic polarizer, the reflective polarizer comprising
      a plurality of first optical layers comprising a first copolyester, the first copolyester being semicrystalline and birefringent, the first copolyester comprising carboxylate subunits and glycol subunits, wherein 70 to 100 mol % of the carboxylate subunits are first carboxylate subunits, 0 to 30 mol % of the carboxylate subunits are first comonomer carboxylate subunits, 70 to 100 mol % of the glycol subunits are first glycol subunits, and 0 to 30 mol % of the glycol subunits are first comonomer glycol subunits, and wherein at least 0.5 mol % of the combined carboxylate and glycol subunits of the first copolyester are first comonomer carboxylate subunits, first comonomer glycol subunits, or a combination thereof; and
      a plurality of second optical layers comprising a second polymer having an in-plane birefringence of about 0.04 or less, at 632.8 nm, after the reflective polarizer has been formed.

2. The optical polarizer of claim 1, wherein at least 2.5 mol % of the combined carboxylate and glycol subunits of the first copolyester are first comonomer carboxylate subunits, first comonomer glycol subunits, or a combination thereof.

3. The optical polarizer of claim 1, wherein the second polymer comprises a second copolyester.

4. The optical polarizer of claim 3, wherein the second copolyester comprises carboxylate subunits and glycol subunits, the carboxylate subunits comprising 20 to 100 mol % second carboxylate subunits and 0 to 80 mol % second comonomer carboxylate subunits, the glycol subunits comprising 40 to 100 mol % second glycol subunits and 0 to 60 mol % second comonomer glycol subunits, wherein 10 mol % or more of the combined carboxylate and glycol subunits of the second copolyester are second comonomer carboxylate subunits, second comonomer glycol subunits, or a combination thereof.

5. The optical polarizer of claim 4, wherein 0.01 to 2.5 mol % of the combined carboxylate and glycol subunits of the second copolyester are second comonomer carboxylate subunits derived from compounds having three or more carboxylate or ester functionalities, second comonomer glycol subunits derived from compounds having three or more hydroxy functionalities, or a combination thereof.

6. The optical polarizer of claim 4, wherein the glycol subunits are derived from 70 to 100 mol % C2–C4 diols and 0 to 30 mol % second comonomer glycol subunits derived from one or more of 1,6-hexanediol, trimethylol propane, neopentyl glycol, or a combination thereof; and the carboxylate subunits are 20 to 100 mol % naphthalate subunits, 0 to 80 mol % terephthalate or isophthalate subunits or mixtures thereof, and 0 to 30 mol % of second comonomer carboxylate subunits derived from phthalic acid, t-butyl-isophthalic acid, lower alkyl esters of these acids, or a combination thereof;
   wherein at least 0.5 mol % of the combined carboxylate and glycol subunits of the second copolyester are second comonomer carboxylate subunits, second comonomer glycol subunits, or a combination thereof.

7. The optical polarizer of claim 4, wherein the second copolyester comprises glycol subunits derived from 85 to 99.99 mol % C2–C4 diols and 0.01 to 5 mol % branching monomer molecules and carboxylate subunits derived from 5 to 95 mol % cyclohexane dicarboxylic acid or lower alkyl esters thereof and 5 to 95 mol % tertiary-butyl isophthalic acid or lower alkyl esters thereof.

8. The optical polarizer of claim 4, wherein the first and second carboxylate subunits are the same.

9. The optical polarizer of claim 1, wherein, after the multilayer reflective polarizer is formed, the first copolyester has an in-plane birefringence of 0.1 or greater at 632.8 nm.

10. The optical polarizer of claim 1, wherein the first carboxylate subunits are naphthalate or terephthalate subunits.

11. The optical polarizer of claim 1, further comprising one or more non-optical layers.

12. The optical polarizer of claim 1, wherein the first copolyester has in-plane indices of 1.83 or less and which differ from each other by 0.20 or greater when measured with 632.8 nm light.

13. The optical polarizer of claim 1, wherein the reflective polarizer is formed by drawing the first and second layers in at least one draw direction to a particular draw ratio and, after drawing, the first optical layers of the reflective polarizer have an index of refraction in the draw direction is at least 0.02 units less, as measured at 632.8 nm, than an index of refraction in the draw direction of a similarly constructed polyethylene naphthalate layer which has a same in-plane birefringence at 632.8 nm.

14. The optical polarizer of claim 1, wherein 1 to 30 mol % of the glycol subunits are first comonomer glycol subunits.

15. The optical polarizer of claim 1, wherein the dichroic polarizer comprises polyvinyl alcohol and a dichroic dye material.

16. The optical polarizer of claim 15, wherein the dichroic polarizer further comprises an additional polymer.

17. The optical polarizer of claim 16, wherein the dichroic polarizer is formed by removal of a solvent from a dispersion of polyvinyl alcohol and the additional polymer in the solvent.

18. The optical polarizer of claim 17, wherein the solvent is water.

19. A method of making an optical polarizer, comprising:

forming a reflective polarizer, the reflective polarizer comprising a plurality of first optical layers comprising a first copolyester, the first copolyester being semicrystalline and birefringent, the first copolyester comprising carboxylate subunits and glycol subunits, wherein 70 to 100 mol % of the carboxylate subunits are first carboxylate subunits, 0 to 30 mol % of the carboxylate subunits are first comonomer carboxylate subunits, 70 to 100 mol % of the glycol subunits are first glycol subunits, and 0 to 30 mol % of the glycol subunits are first comonomer glycol subunits, and wherein at least 0.5 mol % of the combined carboxylate and glycol subunits of the first copolyester are first comonomer carboxylate subunits, first comonomer glycol subunits, or a combination thereof; and a plurality of second optical layers comprising a second polymer having an in-plane birefringence of about 0.04 or less, at 632.8 nm, after the reflective polarizer film has been formed;

forming a dichroic polarizer on the reflective polarizer, the dichroic polarizer comprising polyvinyl alcohol and a dichroic dye material; and stretching the dichroic polarizer and reflective polarizer to orient the dichroic and reflective polarizers at a temperature of about 130° C. or less, without substantial cracking of the dichroic polarizer.

20. The method of claim 19, wherein the temperature at which the dichroic and reflective polarizers are stretched is about 130° C. or less.

21. A method of making an optical polarizer, comprising:

forming a reflective polarizer, the reflective polarizer comprising a plurality of first optical layers comprising a first copolyester, the first copolyester being semicrystalline and birefringent, the first copolyester comprising carboxylate subunits and glycol subunits, wherein 70 to 100 mol % of the carboxylate subunits are first carboxylate subunits, 0 to 30 mol % of the carboxylate subunits are first comonomer carboxylate subunits, 70 to 100 mol % of the glycol subunits are first glycol subunits, and 0 to 30 mol % of the glycol subunits are first comonomer glycol subunits, and wherein at least 0.5 mol % of the combined carboxylate and glycol subunits of the first copolyester are first comonomer carboxylate subunits, first comonomer glycol subunits, or a combination thereof; and a plurality of second optical layers comprising a second polymer having an in-plane birefringence of about 0.04 or less, at 632.8 nm, after the reflective polarizer film has been formed;

forming a dichroic polarizer on the reflective polarizer, the dichroic polarizer comprising polyvinyl alcohol, a second polymer and a dichroic dye; and stretching the dichroic polarizer and reflective polarizer to orient the dichroic and reflective polarizers at a temperature of about 160° C. or less, without substantial cracking of the dichroic polarizer.

22. The method of claim 21, wherein forming the dichroic polarizer comprises forming a dispersion of polyvinyl alcohol and an additional polymer in a solvent;

coating a substrate with the dispersion;

removing the solvent to form a polymeric film; and incorporating a dichroic dye material in the polymeric film.

23. The method of claim 22, wherein the substrate is the reflective polarizer.

24. The method of claim 22, wherein forming the dichroic polarizer further comprises removing the polymeric film from the substrate; and adhering the polymeric film to the reflective polarizer.

25. An optical device, comprising:

a dichroic polarizer; and a multilayer optical film positioned in the same optical path as the dichroic polarizer, the multilayer optical film comprising a plurality of first optical layers comprising a first copolyester, the first copolyester comprising carboxylate subunits and glycol subunits, wherein 70 to 100 mol % of the carboxylate subunits are first carboxylate subunits, 0 to 30 mol % of the carboxylate subunits are first comonomer carboxylate subunits, 70 to 100 mol % of the glycol subunits are first glycol subunits, and 0 to 30 mol % of the glycol subunits are first comonomer glycol subunits, and wherein at least 0.5 mol % of the combined carboxylate and glycol subunits of the first copolyester are first comonomer carboxylate subunits, first comonomer glycol subunits, or a combination thereof; and a plurality of second optical layers comprising a second polymer.

26. The optical device of claim 25, wherein the multilayer optical film comprises a reflective polarizer.

27. The optical device of claim 25, wherein the multilayer optical film comprises a mirror.

28. The optical polarizer of claim 15, wherein the dichroic polarizer is disposed on the reflective polarizer and the dichroic polarizer and reflective polarizer were simultaneously oriented by stretching at a processing temperature without substantial cracking of the dichroic polarizer.

29. An optical polarizer, comprising:

a dichroic polarizer comprising a polymeric film containing polyvinyl alcohol and dichroic dye material; and a reflective polarizer disposed adjacent to the dichroic polarizer and positioned in the same optical path as the dichroic polarizer, the reflective polarizer comprising a plurality of first optical layers, each first optical layer comprising a copolyester having naphthalate subunits, wherein the copolyester is semicrystalline and birefringent, and a plurality of second optical layers, each second optical layer comprising a second polymer having an in-plane birefringence of about 0.04 or less, at 632.8 nm, after the reflective polarizer has been formed;

wherein the copolyester and second polymer are selected to have a glass transition temperature that is sufficiently low to permit simultaneous orienting, by stretching at a processing temperature, of the polymeric film of the dichroic polarizer and the first and second optical layers of the reflective polarizer without generating cracks in the polymeric film.

30. The optical polarizer of claim 29, wherein the dichroic polarizer comprises a blend of polyvinyl alcohol and a second polymer.

31. The optical polarizer of claim 30, wherein the second polymer is selected from the group consisting of polyesters and polyvinyl pyrrolidone.

32. An optical polarizer, comprising:
- a dichroic polarizer comprising a polymeric film containing polyvinyl alcohol and dichroic dye material; and
- a reflective polarizer disposed adjacent to the dichroic polarizer and positioned in the same optical path as the dichroic polarizer, the reflective polarizer comprising
  - a plurality of first optical layers, each first optical layer comprising a copolyester having naphthalate subunits, wherein the first copolyester is semicrystalline and birefringent, and
  - a plurality of second optical layers, each second optical layer comprising a second polymer having an in-plane birefringence of about 0.04 or less, at 632.8 nm, after the reflective polarizer has been formed;

wherein the copolyester and second polymer are selected so that no portion of the dichroic polarizer can be removed in a crosshatched tape pull adhesion test.

* * * * *